(12) United States Patent
Iio et al.

(10) Patent No.: US 12,716,418 B2
(45) Date of Patent: Aug. 25, 2026

(54) ELECTRIC PUMP

(71) Applicant: Makita Corporation, Anjo (JP)

(72) Inventors: Takayoshi Iio, Anjo (JP); Tomoyuki Kutsuna, Anjo (JP); Takaaki Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/932,775

(22) Filed: Oct. 31, 2024

(65) Prior Publication Data

US 2025/0146498 A1 May 8, 2025

(30) Foreign Application Priority Data

Nov. 6, 2023 (JP) ................................ 2023-189295

(51) Int. Cl.

*F04D 25/06* (2006.01)
*F04D 29/40* (2006.01)
*H02K 9/06* (2006.01)
*H02K 11/33* (2016.01)

(52) U.S. Cl.

CPC ....... *F04D 25/0673* (2013.01); *F04D 29/403* (2013.01); *H02K 9/06* (2013.01); *H02K 11/33* (2016.01)

(58) Field of Classification Search

CPC .... F04D 25/0673; F04D 29/403; F04D 13/06; F04D 13/068; H02K 9/06; H02K 11/33
See application file for complete search history.

(56) References Cited

U.S. PATENT DOCUMENTS 5,491,370 A * 2/1996 Schneider .............. H02K 11/33 310/68 R
11,512,696 B2 * 11/2022 Mantes ................... F04C 14/28
12,074,434 B2 * 8/2024 Hacker Davidson ........................ H02J 7/00304
2022/0080437 A1 * 3/2022 Zhong ................. F04D 25/0673
2023/0031253 A1 * 2/2023 Jiabin ...................... F04C 14/08
2024/0141901 A1 * 5/2024 Hoernschemeyer .... F04B 17/03
2024/0263633 A1 * 8/2024 Jiabin ....................... F04C 5/00

FOREIGN PATENT DOCUMENTS

CN 115875301 A 3/2023

* cited by examiner

*Primary Examiner* — Dapinder Singh
(74) *Attorney, Agent, or Firm* — Sughrue Mion, PLLC

(57) ABSTRACT

An electric pump may include: a motor unit; and a pump unit configured to be driven by the motor unit and discharge water. The motor unit may include: a body housing including a battery holding part configured to hold at least one battery pack; and an electric motor accommodated in the body housing and configured to drive the pump unit. The at least one battery pack is configured to be used in the electric pump and in an apparatus other than the electric pump.

16 Claims, 26 Drawing Sheets

FRONT
REAR
UP
DOWN
2
4
6
8
10
12
20
26
34
36
38
40
42
44
50
62
64
66
74
76
78
80
82
84
86
90
92
112
120
124
140
142
144
146
150
152
154
157
160
162
164
166
168
170
174
176
178
182
186
AX
BP
G1
P

FRONT
REAR
UP
DOWN
2
4
112
114
110
98
40
20
26
64
F
62
94
76
92
34
90
100
108
82
42
80
F
84
120
44
128
116
136
124
AX
122
104
106
126
86
38
50
66
BP
78
74
102
36

2
4
36
40
76
BP
66
12
20
82
8
10
146
P
AX
6
UP
DOWN
FRONT
REAR

UP
DOWN
FRONT
REAR
2
4
6
8
10
12
20
36
40
66
76
82
146
BP
P
AX 2
4
66
BP
62
76
12
20
64
82
8
10
146
UP
DOWN
FRONT
REAR
AX
P
6

2
4
66
62
76
BP
12
20
64
82
146
8
10
P
AX
6
UP
DOWN
REAR
FRONT 2
4
66
BP
40
36
76
12
20
82
8
10
146
P
AX
6
UP
DOWN
FRONT
REAR

FIG. 17

2
4
6
40
BP
66a
66
76
36
BP1 200
202
BP1
BP2
20
82
12
146
154
152
AX
RIGHT
LEFT
REAR
FRONT

FIG. 18

2
4
BP
200
BP1
202
BP2
40
66
76
36
20
82
12
146
154
152
AX
6
RIGHT
REAR
LEFT
FRONT

FIG. 19

2
4
6
40
BP
66a
66
BP1
200
36
202
BP2
76
20
82
12
146
154
152
AX
RIGHT
REAR
LEFT
FRONT

UP
DOWN
FRONT
REAR
2
4
6
8
10
12
20
36
40
66
76
82
146
200
202
BP
BP1
BP2
AX
P 2
4
BP
200
BP1
202
BP2
40
76
210
66
12
20
64
82
8
10
146
P
UP
DOWN
FRONT
REAR
AX
6

UP
DOWN
FRONT
REAR
2
4
6
8
10
12
20
36
38
40
66
76
82
146
200
202
BP
BP1
BP2
AX
P

FIG. 23

2
4
BP
200
BP1
202
BP2
40
66
76
36
20
82
12
146
154
152
AX
6
RIGHT
REAR
LEFT
FRONT 2
4
6
BP
BP1
BP2
66
200
202
40
222
220
30
32
76
20
82
12
146
154
152
AX
RIGHT
LEFT
FRONT
REAR

UP
DOWN
FRONT
REAR
2
4
BP
66
202
BP2
40
36
BP1
200
76
12
20
82
8
10
146
P
AX
6

UP
FRONT
REAR
DOWN
8
10
2
4
6
BP
230
232
BP1
66
200
202
AX
146
82
64
20
12
76
234
BP2
P

ELECTRIC PUMP

REFERENCE TO RELATED APPLICATIONS

This application claims priority to Japanese Patent Application No. 2023-189295, filed on Nov. 6, 2023, the entire contents of which are hereby incorporated by reference into the present application.

TECHNICAL FIELD

This disclosure herewith relates to an electric pump.

BACKGROUND ART

Chinese Patent Application Publication No. 115875301 describes an electric pump. The electric pump includes a motor unit and a pump unit configured to be driven by the motor unit and discharge water. The motor unit includes a body housing including a battery holding part configured to hold a battery pack and an electric motor accommodated in the body housing and configured to drive the pump unit.

SUMMARY

A dedicated battery pack is used for the above-mentioned electric pump. Due to this, it is desired to make the electric pump easier to use. The present teachings provide an art configured to allow an electric pump to be used easier.

An electric pump disclosed herein may comprise: a motor unit; and a pump unit configured to be driven by the motor unit and discharge water. The motor unit may comprise: a body housing comprising a battery holding part configured to hold at least one battery pack; and an electric motor accommodated in the body housing and configured to drive the pump unit. The at least one battery pack may be configured to be used in the electric pump and in an apparatus other than the electric pump.

According to the above configuration, versatile battery pack(s) are used. Due to this, the electric pump can be made easier to use.

BRIEF DESCRIPTION OF DRAWINGS

FIG. 1 illustrates a perspective view of an electric pump 2 according to a first embodiment.

FIG. 4 illustrates a perspective view of the motor unit 4 and the battery pack BP according to the first embodiment.

FIG. 17 illustrates a top view of an electric pump 2 according to a seventh embodiment.

FIG. 18 illustrates a top view of an electric pump 2 according to an eighth embodiment.

FIG. 19 illustrates a top view of an electric pump 2 according to a ninth embodiment.

FIG. 23 illustrates a top view of an electric pump 2 according to a thirteenth embodiment.

DESCRIPTION

Figure 2:
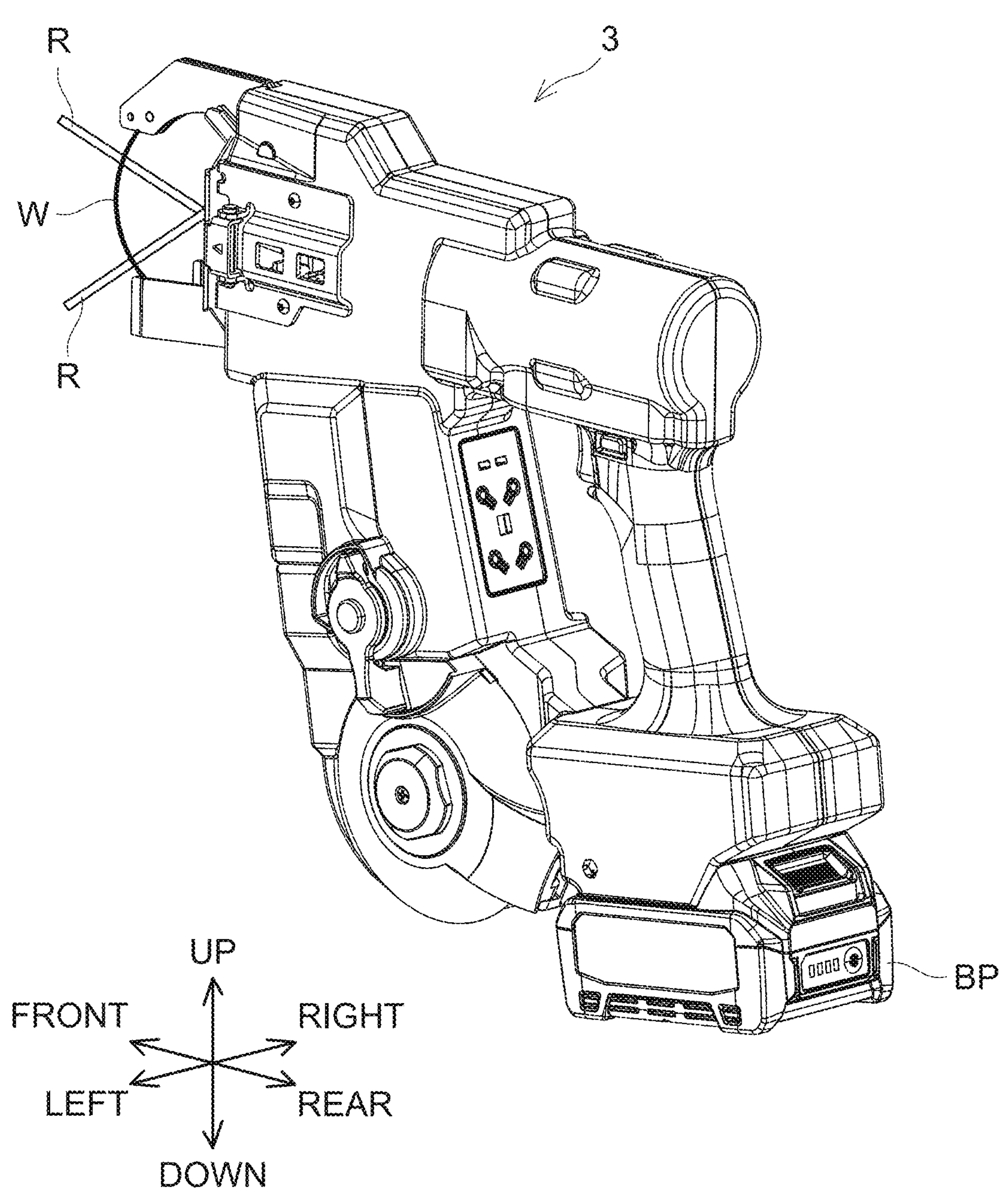
FIG. 2 illustrates a perspective view of a rebar tying tool 3 according to the first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved electric pumps, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the electric motor may be a brushless motor which comprises a stator and a rotor. The motor unit may further comprise: a control unit accommodated in the body housing and configured to drive the electric motor, and a fan configured to rotate integrally with the rotor. The fan may rotate and generate an air flow which cools the control unit in the body housing.

According to the above configuration, the control unit can be suppressed from being excessively heated.

In one or more embodiments, the motor unit may be configured to be attached to and detached from the pump unit.

According to the above configuration, the pump unit can be easily replaced when the pump unit fails.

In one or more embodiments, one end of the motor unit may be supported by the pump unit, and another end of the motor unit may be a free end.

According to the above configuration, as compared to a configuration where one end and the other end of the motor unit are both supported by the pump unit, the configuration of the electric pump can be simplified.

In one or more embodiments, the electric pump may further comprise a contact part located below the body housing and in contact with a placement plane when the electric pump is placed on the placement plane.

According to the above configuration, the body housing can be suppressed from making contact with the placement plane.

In one or more embodiments, the battery holding part may be located above the electric motor when the electric pump is placed on the placement plane.

According to the above configuration, the battery holding part can be suppressed from touching water when the placement plane is wet with water.

In one or more embodiments, the electric motor may be configured to rotate about a central axis extending in a front-rear direction. A length in a left-right direction of the body housing may be shorter than a length in the left-right direction of the contact part, wherein the left-right direction is perpendicular to both the front-rear direction and an up-down direction perpendicular to the placement plane.

In a configuration where the length of the body housing is longer than the length of the contact part, the electric pump may fall when external force is applied on the body housing. According to the above configuration, the electric pump can be suppressed from falling when external force is applied on the body housing.

In one or more embodiments, the length in the left-right direction of the body housing may be shorter than a length in the left-right direction of the pump unit.

In a configuration where the pump is driven by an engine, the length of the body housing is longer than the length of the pump unit. Due to this, a size of the pump is large. According to the above configuration, since the length of the body housing is shorter than the length of the pump unit in the left-right direction, the size of the electric pump can be suppressed from being large.

In one or more embodiments, the electric pump may further comprise a handle fixed to the pump unit and comprising a grip part configured to be gripped by a user. The electric motor may be configured to rotate about a central axis extending in a front-rear direction. A center of gravity of the electric pump may be located farther away from the pump unit than the grip part is in the front-rear direction.

According to the above configuration, the electric pump can be suppressed from being tilted so that the pump unit faces downward when the user is gripping the grip part to lift the electric pump.

In one or more embodiments, the motor unit may further comprise a control unit accommodated in the body housing and configured to drive the electric motor. The electric motor may be at least partially overlapped with the battery holding part when the electric pump is seen along an up-down direction perpendicular to the placement plane, with the electric pump placed on the placement plane.

According to the above configuration, as compared to a configuration where the electric motor does not overlap with the battery holding part when the electric pump is seen along the up-down direction, the size of the electric pump can be suppressed from being large in the front-rear direction.

In one or more embodiments, the electric motor may be at least partially overlapped with the control unit when the electric pump is seen along the up-down direction, with the electric pump placed on the placement plane.

According to the above configuration, as compared to a configuration where the electric motor does not overlap with the control unit when the electric pump is seen along the up-down direction, the size of the electric pump can be suppressed from being large in the front-rear direction.

In one or more embodiments, the electric motor may be configured to rotate about a central axis extending in a front-rear direction. A center of the battery holding part and a center of the electric motor may be located on a first plane in a left-right direction perpendicular to both the front-rear direction and the up-down direction.

According to the above configuration, as compared to a configuration where the center of the battery holding part and the center of the electric motor are not located on the first plane, the size of the electric pump can be suppressed from being large in the left-right direction.

In one or more embodiments, a center of the control unit may be located on the first plane in the left-right direction.

According to the above configuration, as compared to a configuration where the center of the control unit is not located on the first plane in the left-right direction, the size of the electric pump can be suppressed from being large in the left-right direction.

In one or more embodiments, the pump unit may include a discharge port configured to discharge the water. The body housing may comprise an upper wall on which the battery holding part is disposed and which is located below the discharge port when the electric pump is placed on the placement plane. The upper wall may be inclined relative to the placement plane when the electric pump is placed on the placement plane.

According to the above configuration, even when a part of the water discharged from the discharge port contacts the upper wall, the water would flow on the upper wall, and drops on the placement plane. Due to this, the water can be suppressed from remaining on the upper wall.

In one or more embodiments, the at least one battery pack may comprise two battery packs, and the battery holding part may be configured to hold the two battery packs.

According to the above configuration, a running time of the electric pump can be lengthened and the output of the electric pump can be increased.

First Embodiment

Figure 1:
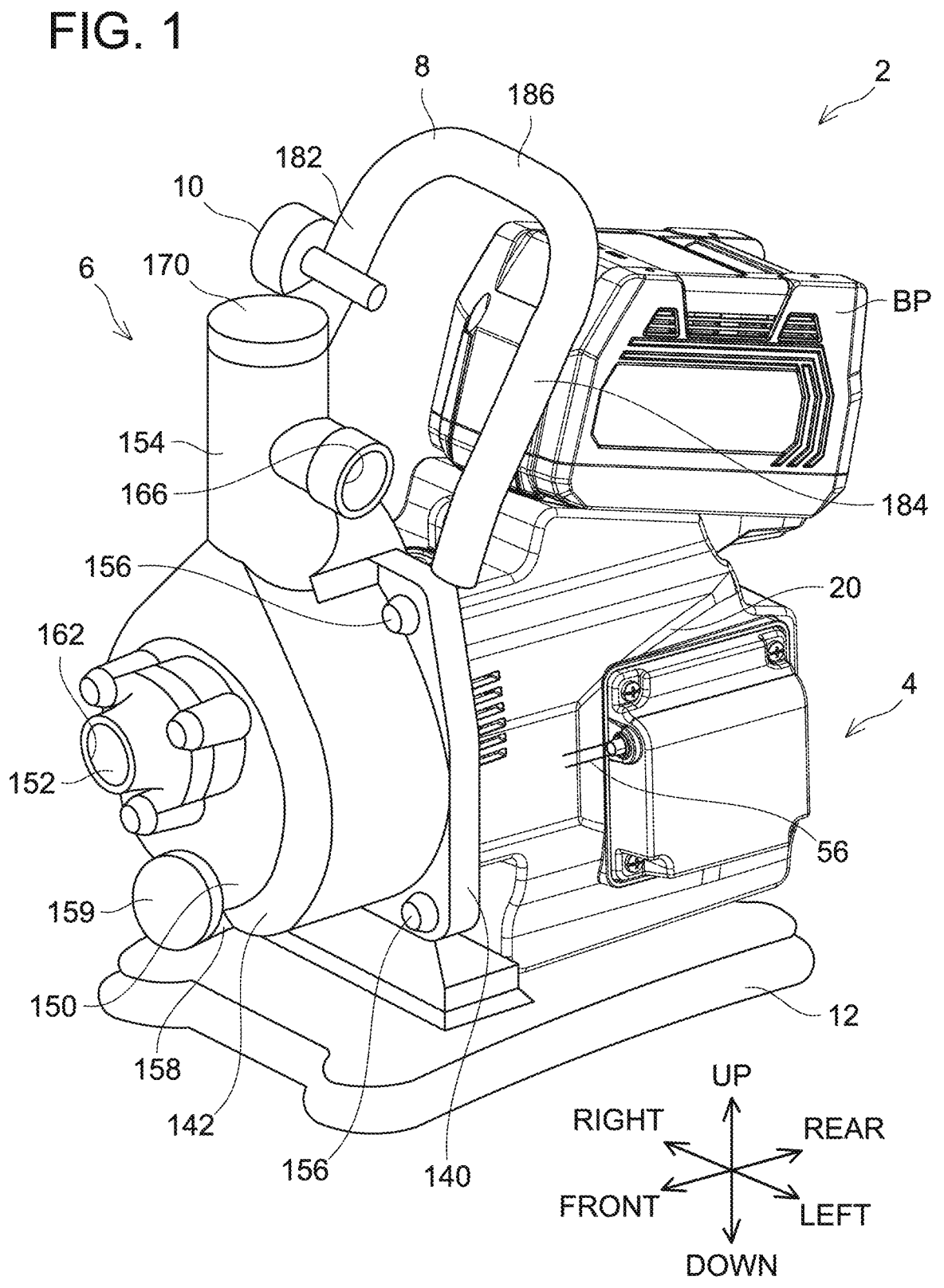

As illustrated in FIG. 1, an electric pump 2 is an electrical apparatus configured to pump liquid, for example, water.

The electric pump 2 comprises a battery pack BP. The electric pump 2 is configured to be driven on power from the battery pack BP. The battery pack BP comprises a secondary battery configured for electric charge and discharge, for example a lithium-ion battery. The battery pack BP is a multi-purpose, versatile battery pack. The battery pack BP is configured to be used in an electrical apparatus other than the electric pump 2. As illustrated in FIG. 2, for example, the battery pack BP can also be used in a rebar tying tool 3 configured to tie plural rebars R using a wire W. Further, the battery pack BP can be used, not limited to in the electric pump 2 and the rebar tying tool 3, in electrical tools such as an impact driver, a hammer drill, and a lawn mower, a grass cutter, a blower, a hedge trimmer, a chainsaw, a cart, a snow remover, and gardening products such as a tiller.

As illustrated in FIG. 1, the electric pump 2 comprises a motor unit 4, a pump unit 6, a handle 8, a throttle lever 10, and a base 12. Hereafter, when the electric pump 2 is placed on a placement plane P (see FIG. 5), a direction perpendicular to the placement plane P will be denoted an up-down direction, a direction perpendicular to the up-down direction will be denoted a front-rear direction, and a direction perpendicular to the up-down and front-rear directions will be denoted a left-right direction.

Figure 3:
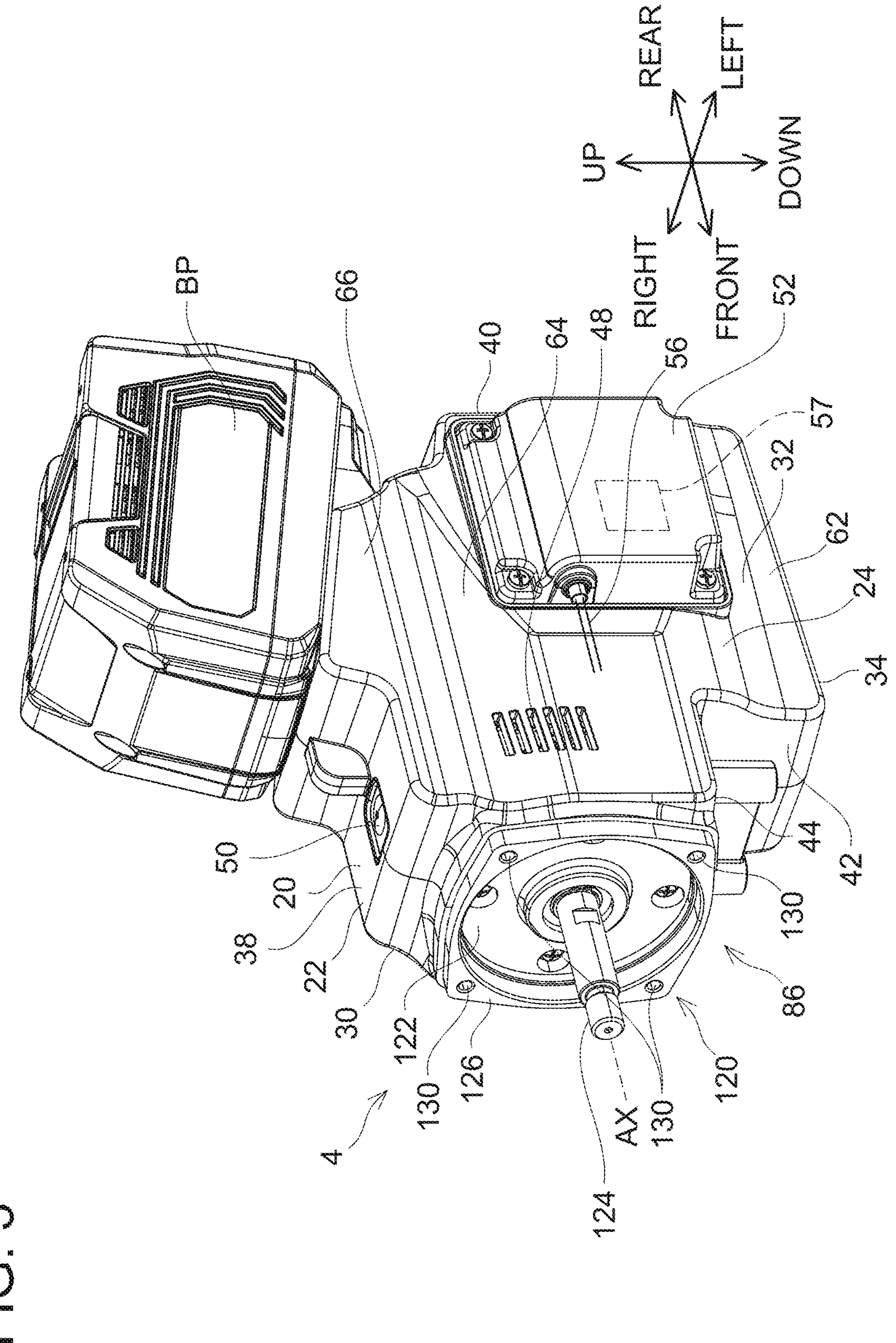
FIG. 3 illustrates a perspective view of a motor unit 4 and a battery pack BP according to the first embodiment.

As illustrated in FIG. 3, the motor unit 4 comprises a body housing 20. The body housing 20 is constituted of a resin material. The body housing 20 comprises a right body housing 22 and a left body housing 24. Each of the right body housing 22 and the left body housing 24 has a shape that divides the body housing 20 in half in a plane along the front-back and up-down directions. An accommodating space 26 (see FIG. 5) is defined between the right body housing 22 and the left body housing 24.

The body housing 20 comprises a right wall 30, a left wall 32, a lower wall 34, a rear upper wall 36 (see FIG. 5), a front upper wall 38, a rear wall 40, a front vertical wall 42, and a front horizontal wall 44.

Figure 4:
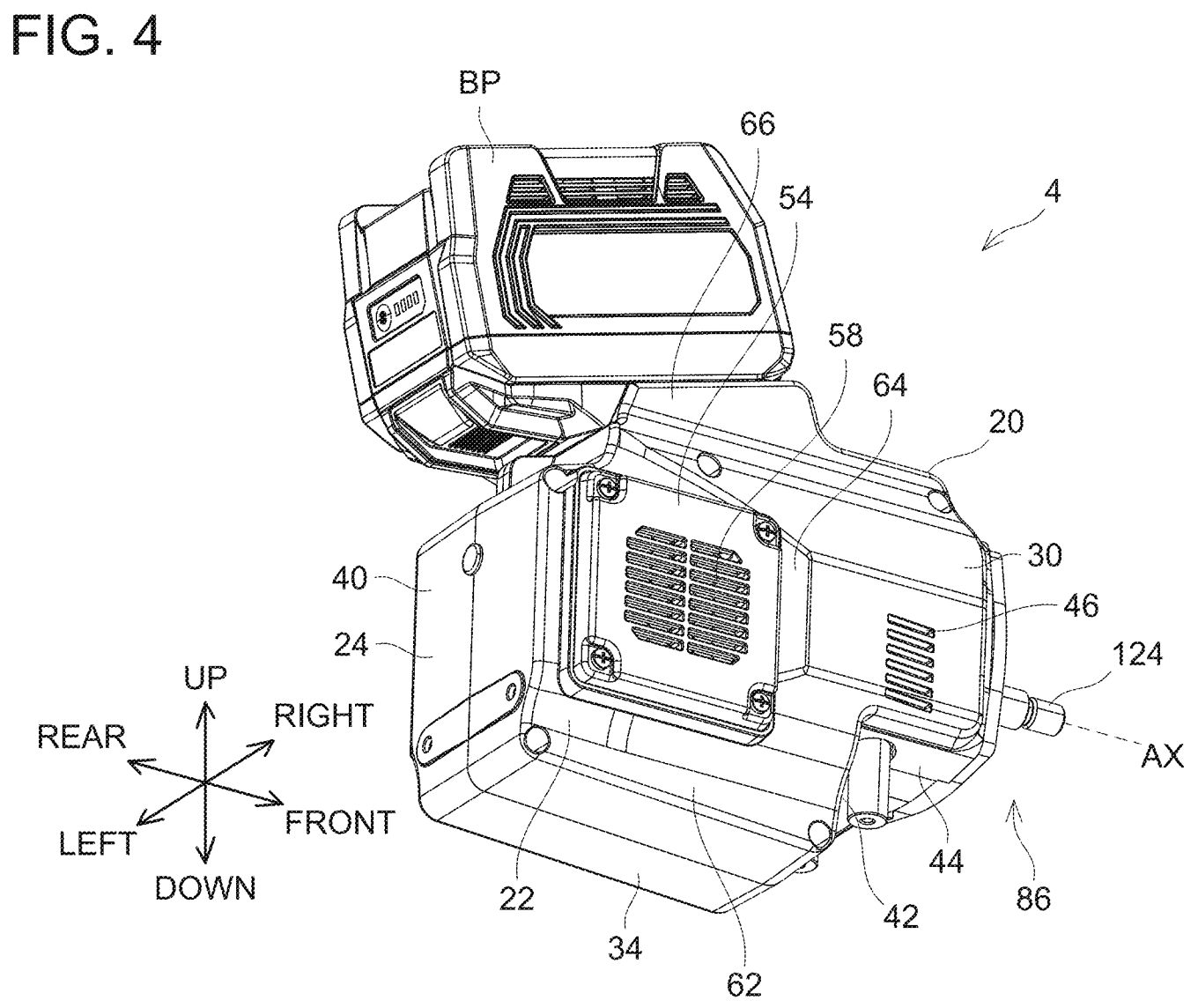

As illustrated in FIG. 4, the right wall 30 has a first air exhaust port 46. The first air exhaust port 46 connects the accommodating space 26 (see FIG. 5) to a space outside the body housing 20.

As illustrated in FIG. 3, the left wall 32 has a second air exhaust port 48. The second air exhaust port 48 connects the accommodating space 26 (see FIG. 5) to the space outside the body housing 20.

Figure 5:
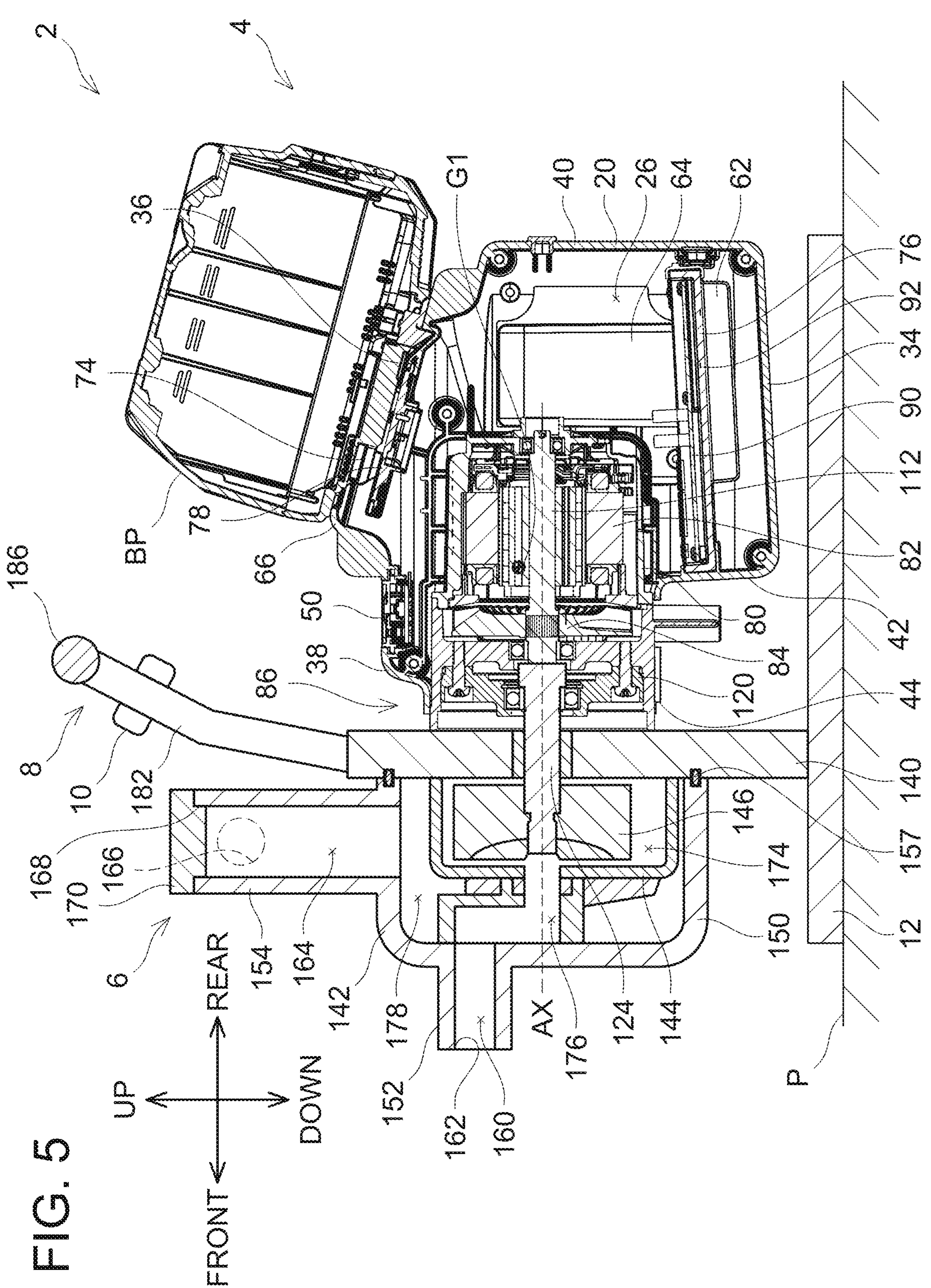
FIG. 5 illustrates a right cross-sectional view of the electric pump 2 according to the first embodiment.

As illustrated in FIG. 5, the lower wall 34 is inclined relative to the placement plane P. The lower wall 34 extends rear-upward. An inclination angle of the lower wall 34 relative to the placement plane P is equal to or more than 5 degrees and equal to or less than 30 degrees. The rear upper wall 36 is inclined relative to the placement plane P. The rear upper wall 36 extends rear-downward. An inclination angle of the rear upper wall 36 relative to the placement plane P is equal to or more than 5 degrees and equal to or less than 45 degrees. The inclination angle of the rear upper wall 36 relative to the placement plane P is greater than the inclination angle of the lower wall 34 relative to the placement plane P.

The front upper wall 38 is substantially parallel to the placement plane P. As illustrated in FIG. 3, the front upper wall 38 has a main power switch 50 disposed thereon. The main power switch 50 is configured to accept an operation by a user of switching between an ON state and OFF state of the electric pump 2.

The front vertical wall 42 extends upward from a front end of the lower wall 34. The front vertical wall 42 is substantially parallel to the rear wall 40. The front horizontal wall 44 extends frontward from an upper end of the front vertical wall 42. The front horizontal wall 44 is substantially parallel to the placement plane P.

As illustrated in FIG. 3, the body housing 20 comprises a throttle cover 52 and an air intake cover 54 (see FIG. 4). The throttle cover 52 is fixed to the left body housing 24. The throttle cover 52 is disposed on a rear side of the second air exhaust port 48. A throttle wire 56 penetrates through the throttle cover 52. The throttle wire 56 extends frontward from the throttle cover 52. The throttle wire 56 is fixed to the throttle lever 10 (see FIG. 1). The motor unit 4 further comprises a detector 57 disposed within the throttle cover 52, and the detector 57 is configured to detect a degree of the throttle wire 56 being pulled. In FIG. 3, the detector 57 is indicated with a dashed line.

As illustrated in FIG. 4, the air intake cover 54 is fixed to the right body housing 22. The air intake cover 54 is located on the rear side of the first air exhaust port 46. The air intake cover 54 has an air intake port 58. The air intake port 58 connects the accommodating space 26 (see FIG. 5) to the space outside the body housing 20.

The body housing 20 comprises a board accommodating part 62, a motor accommodating part 64, and a battery holding part 66. The board accommodating part 62 is positioned in a lower portion of the body housing 20. The motor accommodating part 64 is located above the board accommodating part 62. The battery holding part 66 is located above the motor accommodating part 64.

Figure 6:
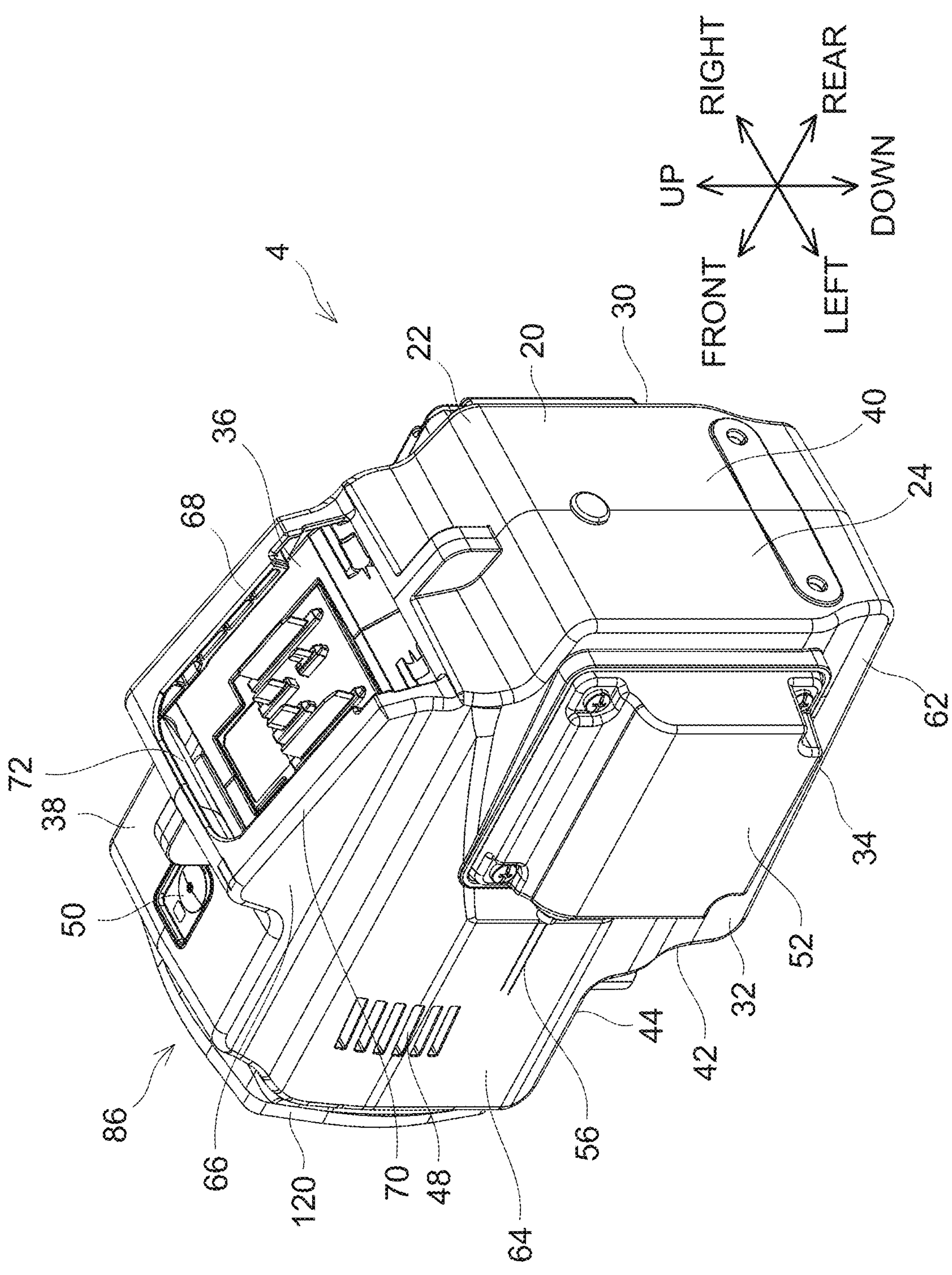
FIG. 6 illustrates a perspective view of the motor unit 4 according to the first embodiment.

As illustrated in FIG. 6, the battery holding part 66 is located on the rear upper wall 36. The battery holding part 66 comprises a right rail 68, a left rail 70, and a connecting wall 72. The right rail 68 and the left rail 70 are rails configured to hold the battery pack BP (see FIG. 3) onto the battery holding part 66. The right rail 68 and the left rail 70 engage slidably with rails 74 (see FIG. 5) of the battery pack BP. The right rail 68 is arranged on a right end of the rear upper wall 36 and extends from a rear end toward a front end of the rear upper wall 36. The left rail 70 is arranged on a left end of the rear upper wall 36, and extends from the rear end toward the front end of the rear upper wall 36. A front end of the right rail 68 and a front end of the left rail 70 are connected with the connecting wall 72. As illustrated in FIG. 3, the battery pack BP is attached to the battery holding part 66 by sliding the battery pack BP front-upward. Also, the battery pack BP is detached from the battery holding part 66 by sliding the battery pack BP rear-downward.

Figure 7:
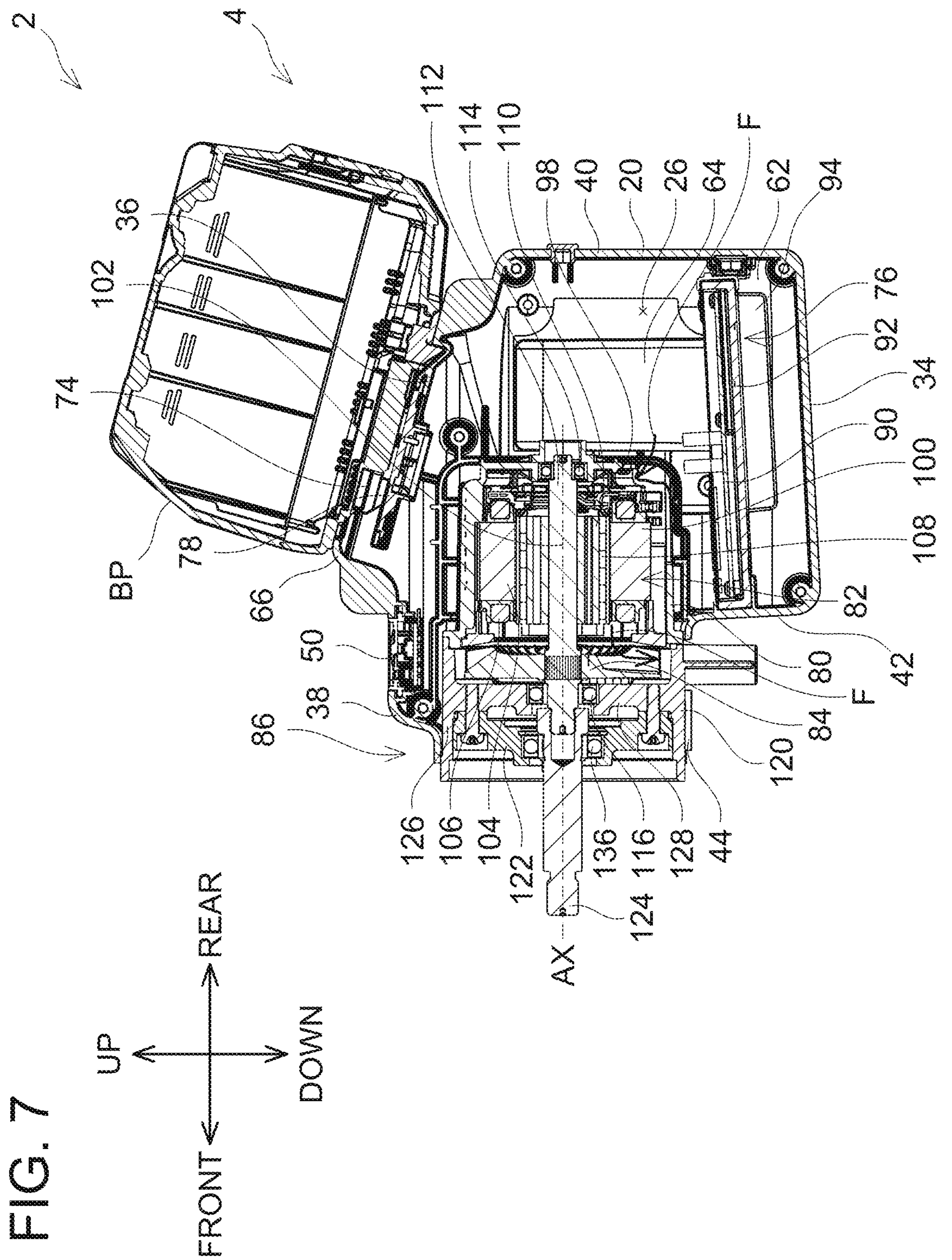
FIG. 7 illustrates a right cross-sectional view of the motor unit 4 and the battery pack BP according to the first embodiment.

As illustrated in FIG. 7, the motor unit 4 comprises a control unit 76, a battery terminal 78, a motor housing 80, an electric motor 82, a fan 84, and an output unit 86. The control unit 76, the motor housing 80, the electric motor 82, the fan 84, and the output unit 86 are disposed in the accommodating space 26.

The control unit 76 is disposed in the board accommodating part 62. The control unit 76 is electrically connected to the main power switch 50, the battery terminal 78, and the electric motor 82. The control unit 76 is configured to operate on power supplied from the battery pack BP via the battery terminal 78. The control unit 76 is configured to drive the electric motor 82 by supplying the power supplied from the battery pack BP to the electric motor 82.

Figure 8:
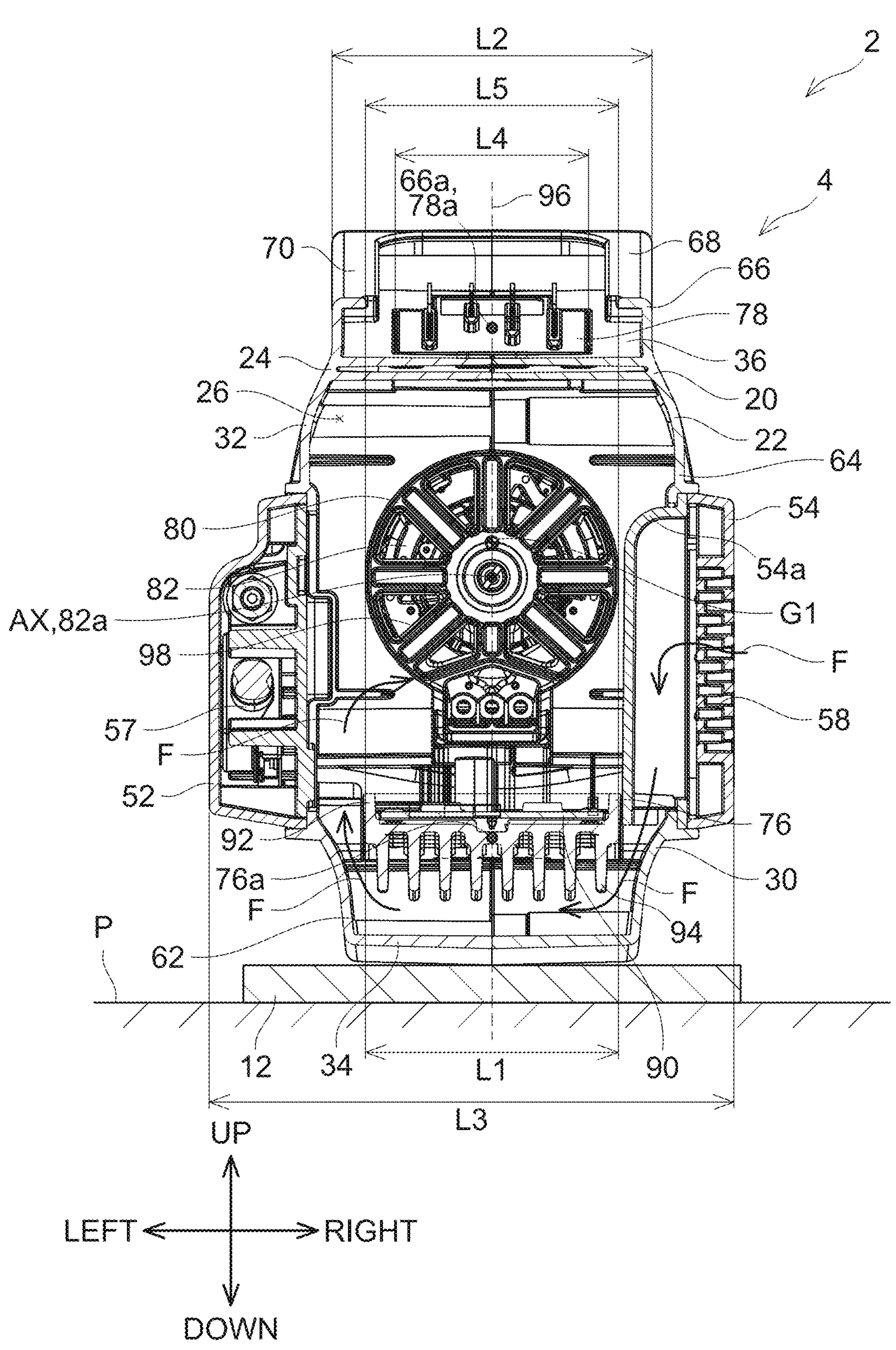
FIG. 8 illustrates a rear cross-sectional view of the motor unit 4 according to the first embodiment.

The control unit 76 comprises a control board 90 with a microcomputer and a plurality of switching elements and a metal casing 92. The switching elements are for example IGBTs or MOSFETs. Each of the switching elements is configured to switch between an ON state and an OFF state by being controlled by the microcomputer. The electric motor 82 is controlled by the respective switching elements being switched between the ON state and the OFF state. The control board 90 is accommodated in the casing 92. The control board 90 and the casing 92 are disposed along the lower wall 34. The casing 92 comprises heat dissipating fins 94 extending downward. In the front-rear direction, the battery holding part 66 is located between a front end and a rear end of the control unit 76. The front end of the control unit 76 corresponds to a front end of the casing 92, whereas the rear end of the control unit 76 corresponds to a rear end of the casing 92. When the electric pump 2 is seen downward, the control unit 76 overlaps at least partially with the battery holding part 66. As illustrated in FIG. 8, a length L1 in the left-right direction of the control unit 76 is shorter than each of a length L2 in the left-right direction of the battery holding part 66 and a length L3 in the left-right direction of the body housing 20. The length L1 is a length between a right end and a left end of the control unit 76. The right end of the control unit 76 corresponds to a right end of the casing 92, whereas the left end of the control unit 76 corresponds to a left end of the casing 92. Further, the length L2 is shorter than the length L3. A center 76*a* in the left-right direction of the control unit 76 and a center 66*a* in the left-right direction of the battery holding part 66 are located on a first plane 96. The center 76*a* is a center between the right end and the left end of the casing 92. The center 66*a* is a center between the right end and the left end of the battery holding part 66. The first plane 96 is perpendicular to the placement plane P and a plane including the front-rear and up-down directions. Also, the first plane 96 is located on a boundary between the right body housing 22 and the left body housing 24. Further, a center of gravity G1 of the electric pump 2 is located on the first plane 96.

As illustrated in FIG. 7, the battery terminal 78 is disposed on the rear upper wall 36. The battery terminal 78 is exposed to the space outside the body housing 20. The battery terminal 78 is electrically connected to a terminal (not illustrated) of the battery pack BP when the battery pack BP is held in the battery holding part 66. In the front-rear direction, the battery terminal 78 is located between the front end and the rear end of the control unit 76. When the electric pump 2 is seen downward, the battery terminal 78 overlaps at least partially with the control unit 76. As illustrated in FIG. 8, a length L4 in the left-right direction of the battery terminal 78 is shorter than the length L1 in the left-right direction of the control unit 76. A center 78*a* in the left-right direction of the battery terminal 78 is located on the first plane 96. The center 78*a* corresponds to a center between the right end and the left end of the battery terminal 78.

As illustrated in FIG. 7, the motor housing 80 is disposed in the motor accommodating part 64. The motor housing 80 has a rear end comprising a plurality of motor air intake ports 98 (see FIG. 8). In the up-down direction, the motor housing 80 is located between the battery holding part 66 and the control unit 76. When the electric pump 2 is seen downward, the motor housing 80 overlaps at least partially with each of the battery holding part 66, the control unit 76, and the battery terminal 78.

The electric motor 82 is accommodated within the motor housing 80. The electric motor 82 is supported by the body housing 20 via the motor housing 80. The electric motor 82 is for example a DC motor. The electric motor 82 is for example an inner rotor brushless motor. In a modification, the electric motor 82 may be an outer rotor brushless motor, or a brushed motor. A maximum output of the electric motor 82 may be equal to or more than 0.5 kW and equal to or less than 2.0 kW, may for example be equal to or more than 0.5 kW and equal to or less than 1.5 kW, may be equal to or more than 0.5 kW and equal to or less than 1.2 kW, and may be equal to or more than 0.5 kW and equal to or less than 1.0 kW.

In the up-down direction, the electric motor 82 is located below the battery holding part 66, and is located above the control unit 76. When the electric pump 2 is seen downward, the electric motor 82 overlaps at least partially with each of the battery holding part 66, the control unit 76, and the battery terminal 78. As illustrated in FIG. 8, a length L5 (i.e. diameter) in the left-right direction of the electric motor 82 is shorter than the length L2 in the left-right direction of the battery holding part 66, and is longer than the length L4 in the left-right direction of the battery terminal 78. The length L5 is substantially equal to the length L1. A center 82*a* in the left-right direction of the electric motor 82 is located on the first plane 96. The center 82*a* is a center between a right end and a left end of the electric motor 82.

As illustrated in FIG. 7, the electric motor 82 comprises a stator 100 and a rotor 102. A diameter of the stator 100 corresponds to a diameter of the electric motor 82. A right end and a left end of the stator 100 respectively correspond to a right end and a left end of the electric motor 82. The stator 100 comprises a stator core 104 and a plurality of coils 106. Each coil 106 is wound on the stator core 104. The rotor 102 penetrates the stator 100 in the front-rear direction. The rotor 102 comprises a rotor body 110 including a plurality of permanent magnets 108. The motor unit 4 further comprises a shaft 112, and the shaft 112 penetrates the rotor body 110 in the front-rear direction. The shaft 112 extends in the front-rear direction. A rear end of the shaft 112 is rotatably supported by the motor housing 80 via a bearing 114. A front end of the shaft 112 is rotatably supported by the output unit 86 via a bearing 116. When the microcomputer of the control unit 76 switches the switching elements selectively between the ON state and the OFF state, power of the battery pack BP is supplied to each coil 106. Magnetic field generated about each coil 106 allows the rotor body 110 to rotate about a central axis AX. Due to this, the shaft 112 rotates about the central axis AX.

The fan 84 is fixed to the shaft 112 outside the motor housing 80. The fan 84 is a centrifugal fan. In a modification, the fan 84 may be an axial fan. The fan 84 rotates about the central axis AX unitedly with the shaft 112.

When the fan 84 rotates, a flow of air is generated in the accommodating space 26 as illustrated in FIG. 8. Firstly, the air passes through the air intake port 58 and flows into the accommodating space 26 from the space outside the body housing 20. In the drawings, the flow of air is shown by arrow lines denoted sign F. The inflow air flows downward along a baffle plate 54*a* of the air intake cover 54, and then flows clockwise about the control unit 76 when the electric pump 2 is seen frontward. By the air contacting the heat dissipating fins 94, the casing 92 is cooled. Accordingly, the control board 90 is cooled. As illustrated in FIG. 7, thereafter, the air passes between the control unit 76 and the battery terminal 78, and flows toward the plurality of motor air intake ports 98. Due to this, the control unit 76 and the battery terminal 78 are cooled.

The air passes through the motor air intake ports 98 and flows into the motor housing 80. The inflow air flows frontward inside the motor housing 80. Due to this, the electric motor 82 is cooled. When the air has reached the fan 84, the fan 84 sends the air in a direction separating away from the central axis AX. Thereafter, the air passes through the first air exhaust port 46 (see FIG. 4) and the second air exhaust port 48 (see FIG. 3), and is discharged to the space outside the body housing 20.

Figure 9:
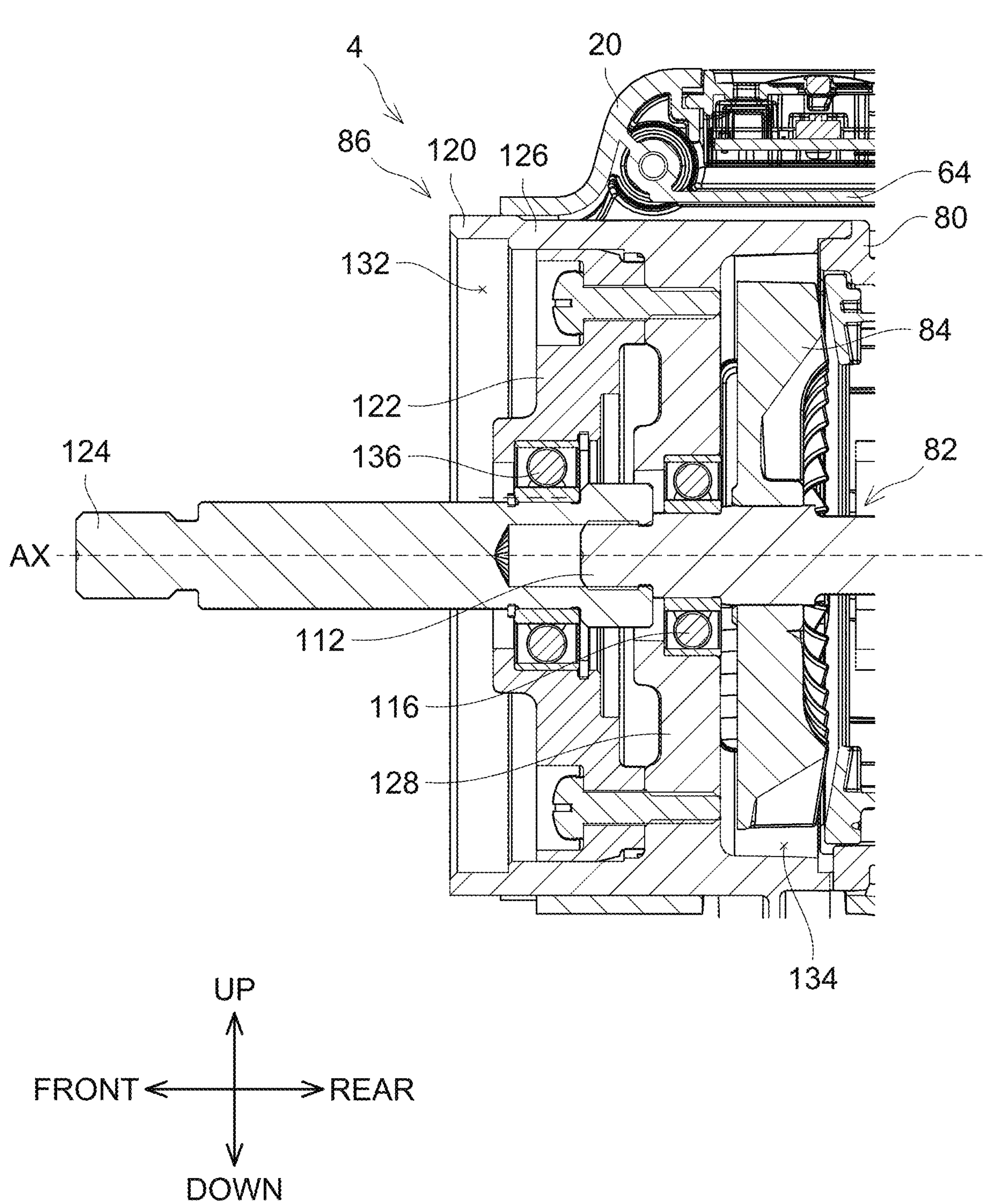
FIG. 9 illustrates a right cross-sectional view of an output unit 86 and its vicinity in the motor unit 4 according to the first embodiment.

As illustrated in FIG. 9, the output unit 86 is disposed in a front portion of the motor accommodating part 64. The output unit 86 penetrates a front end of the body housing 20. The output unit 86 is fixed to the front end of the body housing 20. The output unit 86 is fixed to the front end of the motor housing 80.

The output unit 86 comprises a mount base 120, a support member 122, and a spindle 124.

The mount base 120 comprises a tube part 126 and a bulkhead part 128. An inner surface of the tube part 126 has a substantially circular cross-section. As illustrated in FIG. 3, the tube part 126 has a plurality of (four in the present embodiment) screw holes 130. The screw holes 130 are arranged in a front surface of the tube part 126. The front surface of the tube part 126 corresponds to a front surface of the motor unit 4.

As illustrated in FIG. 9, the bulkhead part 128 has a substantially circular disk shape. The bulkhead part 128 is disposed inside the tube part 126. The bulkhead part 128 is connected to the inner surface of the tube part 126. The bulkhead part 128 sections an internal space of the tube part 126 into a front-side space 132 and a rear-side space 134. The bulkhead part 128 has the shaft 112 penetrating therethrough. The bulkhead part 128 supports the shaft 112 via the bearing 116 such that the shaft 112 is rotatable. The fan 84 is disposed in the rear-side space 134.

The support member 122 is disposed in the front-side space 132. The support member 122 is fixed to a front surface of the bulkhead part 128.

The spindle 124 extends in the front-rear direction. The spindle 124 penetrates the support member 122 in the front-rear direction. The spindle 124 is supported by the support member 122 via a bearing 136 so as to be rotatable. A rear end of the spindle 124 engages with the front end of the shaft 112. The spindle 124 rotates about the central axis AX unitedly with the shaft 112.

As illustrated in FIG. 5, the pump unit 6 is fixed to a front end of the motor unit 4 by screws (not shown) being screwed into the plurality of screw holes 130 (see FIG. 3) of the mount base 120. The pump unit 6 is configured to be attached to and detached from the motor unit 4. The pump unit 6 supports the front end of (i.e., fixed end) of the motor unit 4 but does not support a rear end (i.e., free end) of the motor unit 4. That is, the pump unit 6 supports the motor unit 4 with a cantilever structure.

Figure 10:
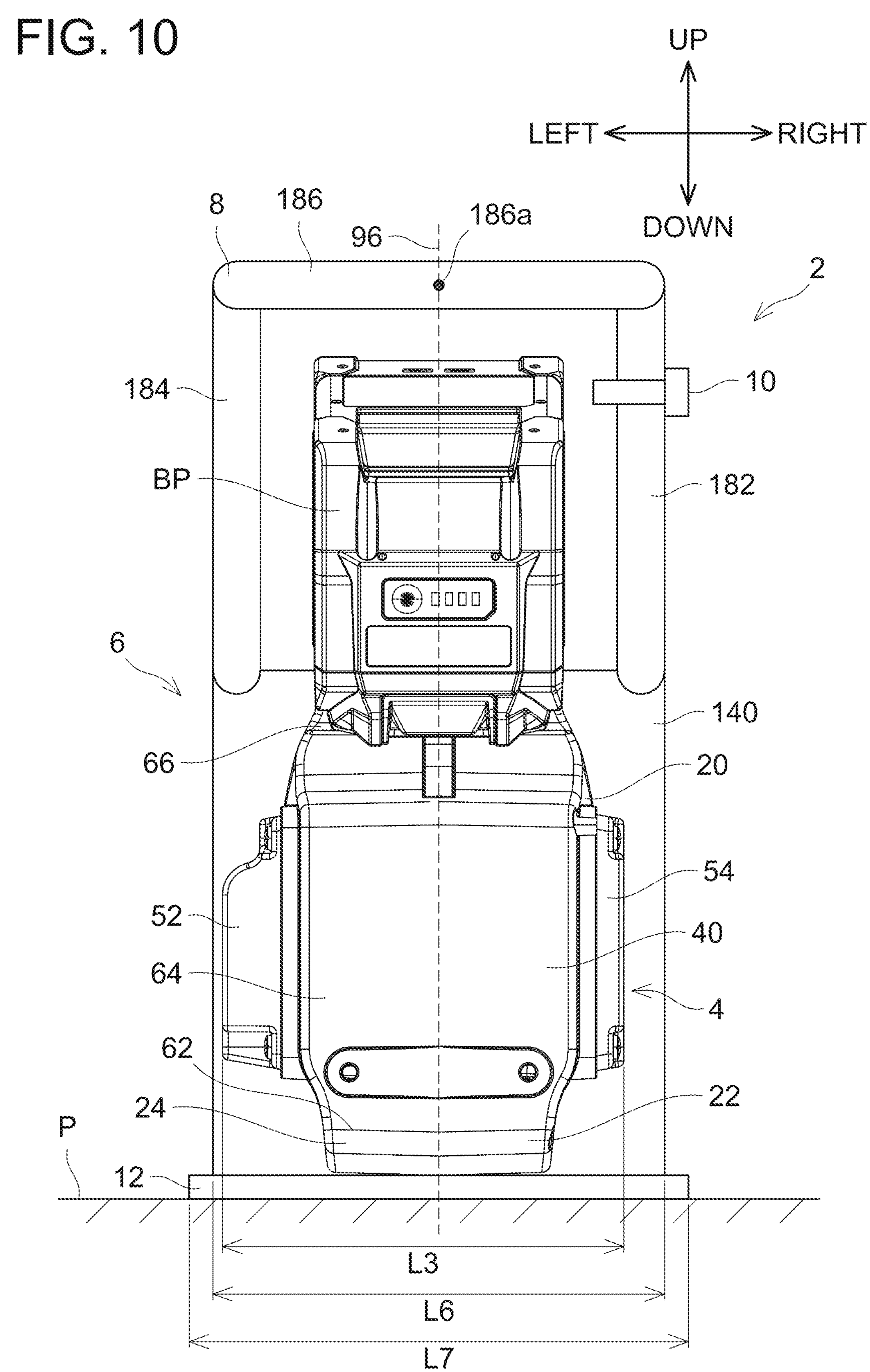
FIG. 10 illustrates a rear view of the electric pump 2 according to the first embodiment.

As illustrated in FIG. 10, a length L6 in the left-right direction of the pump unit 6 is longer than the length L3 in the left-right direction of the body housing 20. In the left-right direction, the body housing 20 is positioned between a left end and a right end of the pump unit 6.

Figure 11:
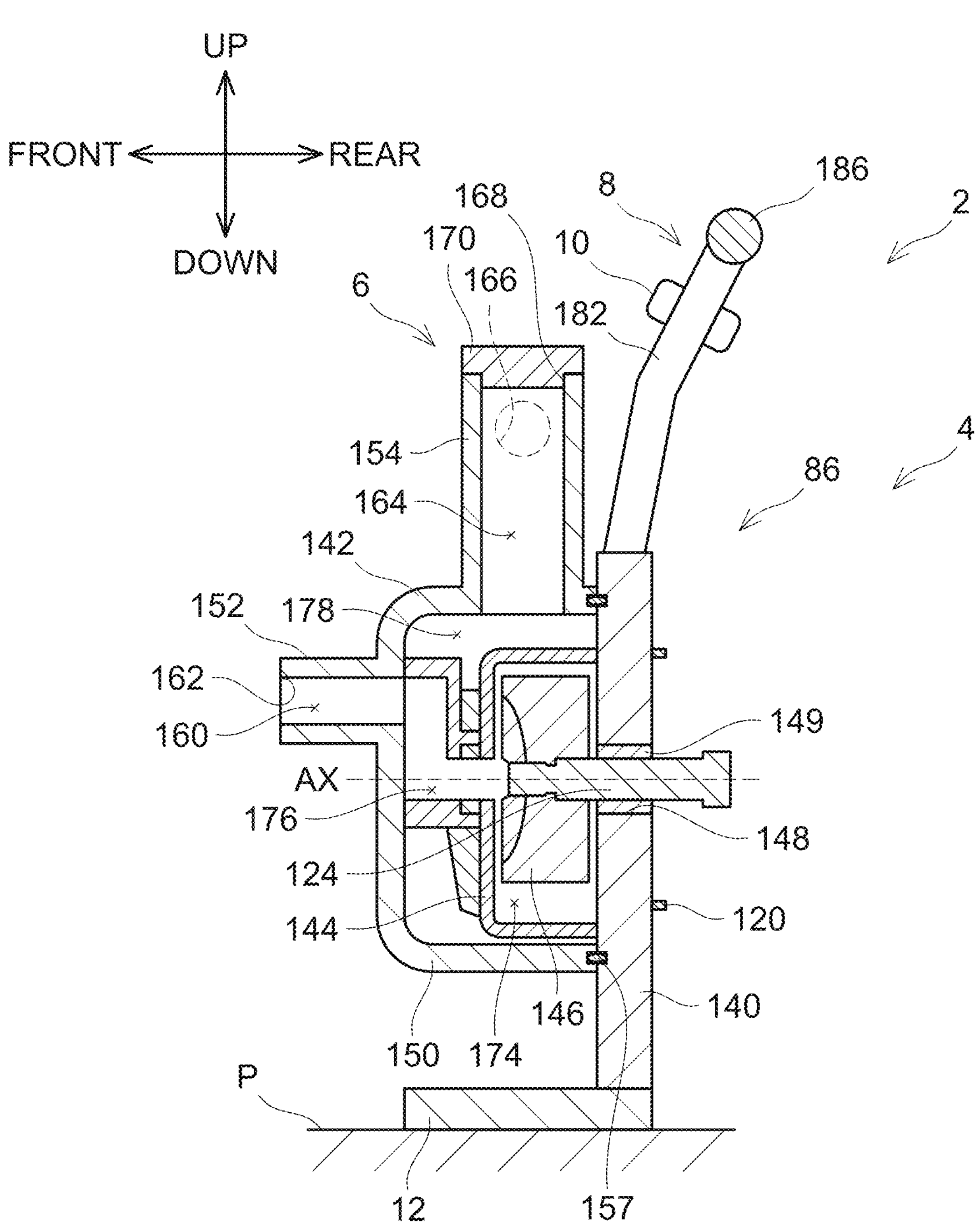
FIG. 11 illustrates a right cross-sectional view of a pump unit 6 and its vicinity in the electric pump 2 according to the first embodiment.

As illustrated in FIG. 11, the pump unit 6 comprises a rear-side pump housing 140, a front-side pump housing 142, an inner housing 144, and an impeller 146.

The rear-side pump housing 140 has a flat plate shape extending along the up-down and left-right directions. A rear surface of the rear-side pump housing 140 is in contact with a front end of the mount base 120 (i.e., front end of the motor unit 4). The rear-side pump housing 140 has a through hole 148. The through hole 148 has the spindle 124 passing therethrough. A sealer 149 is located between the spindle 124 and the rear-side pump housing 140. The sealer 149 is configured to suppress liquid from flowing between the spindle 124 and the rear-side pump housing 140. The spindle 124 is rotatably supported by the rear-side pump housing 140 via the sealer 149.

The front-side pump housing 142 is positioned on a front side of the rear-side pump housing 140. The front-side pump housing 142 comprises an accommodating part 150, a suction part 152, and a discharge part 154.

The accommodating part 150 is fixed by screws 156 (see FIG. 1) to the rear-side pump housing 140. A sealing ring 157 is located between the accommodating part 150 and the rear-side pump housing 140. As illustrated in FIG. 1, the accommodating part 150 has a drain port 158. The drain port 158 connects inside and outside of the accommodating part 150. Normally, the drain port 158 is closed by a cap 159.

The suction part 152 extends frontward from a front end of the accommodating part 150. The suction part 152 is located above the drain port 158. The suction part 152 is attached to a water supplier not illustrated. As illustrated in FIG. 11, the suction part 152 includes a suction passage 160 extending in the front-rear direction. In FIGS. 5 and 11, illustrations of the drain port 158 and the cap 159 are omitted. The suction passage 160 is connected with a space inside the accommodating part 150. Hereafter, a front end of the suction passage 160 may be termed a suction port 162. The suction passage 160 is located above the spindle 124. As illustrated in FIG. 5, the suction passage 160 is located below each of the battery holding part 66 and the battery terminal 78. The suction passage 160 is located above the control unit 76.

As illustrated in FIG. 1, the discharge part 154 extends upward from an upper end of the accommodating part 150 and then bends to extend leftward. As illustrated in FIG. 11, the discharge part 154 includes a discharge passage 164. The discharge passage 164 is connected with the space inside the accommodating part 150. The discharge passage 164 extends upward and then bends to extend leftward. Hereafter, a left end of the discharge passage 164 may be termed a discharge port 166. In FIGS. 5 and 11, the position of the discharge port 166 is shown by a dashed line. The discharge port 166 is located above the suction port 162. As illustrated in FIG. 5, the discharge port 166 is located above each of the battery holding part 66 and the battery terminal 78.

As illustrated in FIG. 11, the discharge part 154 has a water supply port 168. The water supply port 168 connects the discharge passage 164 to a space outside the pump unit 6. Normally, the water supply port 168 is closed by a cap 170.

The inner housing 144 has a vortex chamber 174 therein. The vortex chamber 174 extends in a swirling pattern about the central axis AX. When the inner housing 144 is accommodated in the accommodating part 150, a suction space 176 and a discharge space 178 are defined between the inner housing 144 and the accommodating part 150. The suction space 176 and the discharge space 178 are not directly connected to each other. The vortex chamber 174 is connected with the suction passage 160 via the suction space 176. The vortex chamber 174 is connected with the discharge passage 164 via the discharge space 178.

The impeller 146 is disposed in the vortex chamber 174. The impeller 146 engages with a front end of the spindle 124. As illustrated in FIG. 5, the impeller 146 is located below each of the battery holding part 66 and the battery terminal 78. The impeller 146 is located above the control unit 76. A diameter of the impeller 146 is greater than a diameter of the electric motor 82.

When the electric pump 2 is to be operated, firstly, as illustrated in FIG. 5, the cap 170 is removed and then water is poured through the water supply port 168 into the pump unit 6. Due to this, the interior of the pump unit 6 is filled with water. Next, the electric motor 82 is activated. Due to this, the impeller 146 rotates unitedly with the shaft 112 and the spindle 124 about the central axis AX. As illustrated in FIG. 11, as the impeller 146 rotates, the water supplied from the water supplier (not shown) flows through the suction port 162 into the suction passage 160. The inflow water flows sequentially in the suction passage 160 and the suction space 176, and then flows into the vortex chamber 174. Subsequently, the water is sent by the impeller 146 in the direction separating away from the central axis AX, and flows in the vortex chamber 174. Lastly, the water flows sequentially in the discharge space 178 and the discharge passage 164, and then is discharged from the discharge port 166. Next, when the operation of the electric motor 82 (see FIG. 5) is stopped, the impeller 146 stops rotating. Due to this, the discharge port 166 stops discharging the water. Lastly, as illustrated in FIG. 1, the cap 159 is detached from the pump unit 6. Due to this, the water is discharged from the drain port 158 to outside of the pump unit 6.

The handle 8 has a substantially U shape. The handle 8 comprises a right connecting part 182, a left connecting part 184, and a grip part 186.

One end of the right connecting part 182 and one end of the left connecting part 184 are fixed to the rear-side pump housing 140. The right connecting part 182 and the left connecting part 184 extend rear-upward from the rear-side pump housing 140.

The grip part 186 is configured to be gripped by a user. The grip part 186 is connected to another end of the right connecting part 182 and another end of the left connecting part 184. The grip part 186 extends in the left-right direction. As illustrated in FIG. 5, the grip part 186 is located above each of the discharge part 154, the battery pack BP, the battery holding part 66, and the battery terminal 78. In the front-rear direction, the grip part 186 is located at a spot most away from the rear-side pump housing 140. In the front-rear direction, the grip part 186 is located on the rear side of the rear-side pump housing 140. In the front-rear direction, the grip part 186 is located on the front side of the control unit 76, the battery terminal 78, the electric motor 82, and the center of gravity G1 of the electric pump 2. In the front-rear direction, the center of gravity G1 of the electric pump 2 is farther away from the rear-side pump housing 140 than the grip part 186 is. As illustrated in FIG. 10, In the left-right direction, a center 186*a* of the grip part 186 is located on the first plane 96. The center 186*a* is a center between a right end and a left end of the grip part 186.

The throttle lever 10 is attached to the right connecting part 182. The throttle lever 10 is configured to be operated by the user. When the throttle lever 10 is operated, the throttle wire 56 (see FIG. 3) is pulled. The control unit 76 (see FIG. 5) drives the electric motor 82 (see FIG. 5) according to a degree detected by the detector 57 (see FIG. 3) at which the throttle wire 56 is pulled. As a degree at which the throttle lever 10 is operated increases (i.e., as the degree at which the throttle wire 56 is pulled increases), a rotary speed of the electric motor 82 (i.e., rotary speed of the shaft 112) gradually rises from zero.

As illustrated in FIG. 5, a base 12 is fixed to a lower end of the rear-side pump housing 140. The base 12 has a flat plate shape extending along the front-rear and left-right directions. The base 12 is located below the body housing 20. When the electric pump 2 is placed on the placement plane P, only the base 12 is in contact with the placement plane P. In the front-rear direction, a front end of the base 12 is located on the front side of the body housing 20 and the rear-side pump housing 140. A rear end of the base 12 is located on the rear side of the body housing 20 and the battery pack BP. As illustrated in FIG. 10, a length L7 in the left-right direction of the base 12 is longer than each of the length L3 in the left-right direction of the body housing 20 and the length L6 in the left-right direction of the pump unit 6. In the left-right direction, the body housing 20 and the pump unit 6 are located between the left end and the right end of the base 12. When the electric pump 2 is seen downward, an entirety of the body housing 20 overlaps with the base 12.

(Effects) The electric pump 2 according to the present embodiment comprises the motor unit 4; and the pump unit 6 configured to be driven by the motor unit 4 and discharge water. The motor unit 4 comprises: the body housing 20 comprising the battery holding part 66 configured to hold the battery pack BP; and the electric motor 82 accommodated in the body housing 20 and configured to drive the pump unit 6. The battery pack BP is configured to be used in the electric pump 2 and the rebar tying tool 3 (examples for an apparatus) other than the electric pump 2.

According to the above configuration, the battery pack BP that is versatile is used in the electric pump 2. Due to this, the electric pump 2 can be made easier to use.

The electric motor 82 is a brushless motor which comprises the stator 100 and the rotor 102. The motor unit 4 further comprises the control unit 76 accommodated in the body housing 20 and configured to drive the electric motor 82, and the fan 84 configured to rotate integrally with the rotor 102. The fan 84 rotates and generates an air flow which cools the control unit 76 in the body housing 20.

According to the above configuration, the control unit 76 can be suppressed from being excessively heated.

The motor unit 4 is configured to be attached to and detached from the pump unit 6.

According to the above configuration, the pump unit 6 can be easily replaced when the pump unit 6 fails.

The one end of the motor unit 4 is supported by the pump unit 6, and the other end of the motor unit 4 is a free end.

According to the above configuration, as compared to a configuration where one end and the other end of the motor unit 4 are both supported by the pump unit 6, the configuration of the electric pump 2 can be simplified.

The electric pump 2 further comprises the base 12 (example for a contact part) located below the body housing 20 and in contact with the placement plane P when the electric pump 2 is placed on the placement plane P.

According to the above configuration, the body housing 20 can be suppressed from making contact with the placement plane P.

The battery holding part 66 is located above the electric motor 82 when the electric pump 2 is placed on the placement plane P.

According to the above configuration, the battery holding part 66 can be suppressed from touching water when the placement plane P is wet with the water.

The electric motor 82 is configured to rotate about the central axis AX extending in the front-rear direction. The length L3 in the left-right direction of the body housing 20 is shorter than the length L7 in the left-right direction of the base 12, wherein the left-right direction is perpendicular to both the front-rear direction and the placement plane P.

In a configuration where the length L3 of the body housing 20 is longer than the length L7 of the base 12, the electric pump 2 may fall when external force is applied on the body housing 20. According to the above configuration, the electric pump 2 can be suppressed from falling when external force is applied on the body housing 20.

In the left-right direction, the length L3 of the body housing 20 is shorter than the length L6 of the pump unit 6.

In a configuration where the pump is driven by an engine, the length L3 of the body housing 20 is longer than the length L6 of the pump unit 6. Due to this, a size of the pump is large. According to the above configuration, since the length L3 of the body housing 20 is shorter than the length L6 of the pump unit 6 in the left-right direction, the size of the electric pump 2 can be suppressed from being large.

The electric pump 2 further comprises the handle 8 fixed to the pump unit 6 and comprising the grip part 186 configured to be gripped by a user. The electric motor 82 is configured to rotate about the central axis AX extending in the front-rear direction. The center of gravity G1 of the electric pump 2 is located farther away from the pump unit 6 than the grip part 186 is.

According to the above configuration, the electric pump 2 can be suppressed from being tilted so that the pump unit 6 faces downward when the user is gripping the grip part 186 to lift the electric pump 2.

The motor unit 4 comprises the control unit 76 accommodated in the body housing 20 and configured to drive the electric motor 82. The electric motor 82 is at least partially overlapped with the battery holding part 66 when the electric pump 2 is seen along the up-down direction perpendicular to the placement plane P, with the electric pump 2 placed on the placement plane P.

According to the above configuration, as compared to a configuration where the electric motor 82 does not overlap with the battery holding part 66 when the electric pump 2 is seen along the up-down direction, the size of the electric pump 2 can be suppressed from being large in the front-rear direction.

The electric motor 82 is at least partially overlapped with the control unit 76 when the electric pump 2 is seen along the up-down direction, with the electric pump 2 placed on the placement plane P.

According to the above configuration, as compared to a configuration where the electric motor 82 does not overlap with the control unit 76 when the electric pump 2 is seen along the up-down direction, the size of the electric pump 2 can be suppressed from being large in the front-rear direction.

The electric motor 82 is configured to rotate about the central axis AX extending in the front-rear direction. The center 66*a* of the battery holding part 66 and the center 82*a* of the electric motor 82 are located on the first plane 96 in the left-right direction perpendicular to both the front-rear and up-down directions.

According to the above configuration, as compared to a configuration where the center 66*a* of the battery holding part 66 and the center 82*a* of the electric motor 82 are not located on the first plane 96, the size of the electric pump 2 can be suppressed from being large in the left-right direction.

The center 76*a* of the control unit 76 is located on the first plane 96 in the left-right direction.

According to the above configuration, as compared to a configuration where the center 76*a* of the control unit 76 is not located on the first plane 96 in the left-right direction, the size of the electric pump 2 can be suppressed from being large in the left-right direction.

The pump unit 6 includes the discharge port 166 configured to discharge the water. The body housing 20 comprises the rear upper wall 36 (example for an upper wall) on which the battery holding part 66 is disposed and which is located below the discharge port 166 when the electric pump 2 is placed on the placement plane P. The rear upper wall 36 is inclined relative to the placement plane P when the electric pump 2 is placed on the placement plane P.

According to the above configuration, even when a part of the water discharged from the discharge port 166 contacts the rear upper wall 36, the water would flow on the rear upper wall 36, and drops on the placement plane P. Due to this, the water can be suppressed from remaining on the rear upper wall 36.

Second Embodiment

Figure 12:
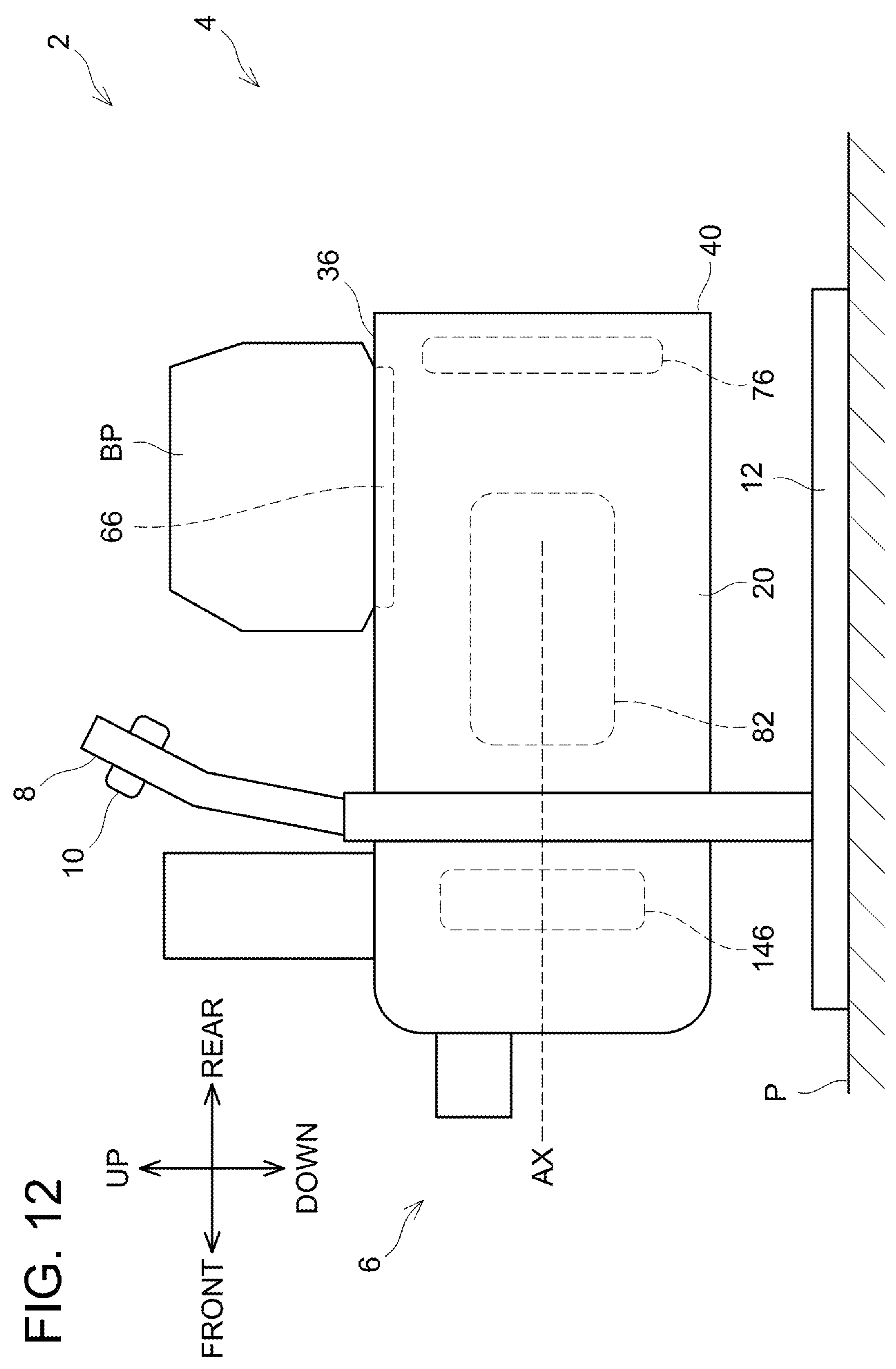
FIG. 12 illustrates a right side view of an electric pump 2 according to a second embodiment.

In a second embodiment, only points differing from the first embodiment will be described. As illustrated in FIG. 12, the control unit 76 is located behind the electric motor 82. The control unit 76 is located along a plane including the up-down and the left-right directions. When the electric pump 2 is seen frontward, the control unit 76 is at least partially overlapped with each of the electric motor 82 and the impeller 146. By sliding the battery pack BP on the battery holding part 66 parallel to the placement plane P, the battery pack BP is attached to and detached from the battery holding part 66. A direction in which the battery pack BP is attached to the battery holding part 66 may be frontward, leftward, or rightward.

Third Embodiment

Figure 13:
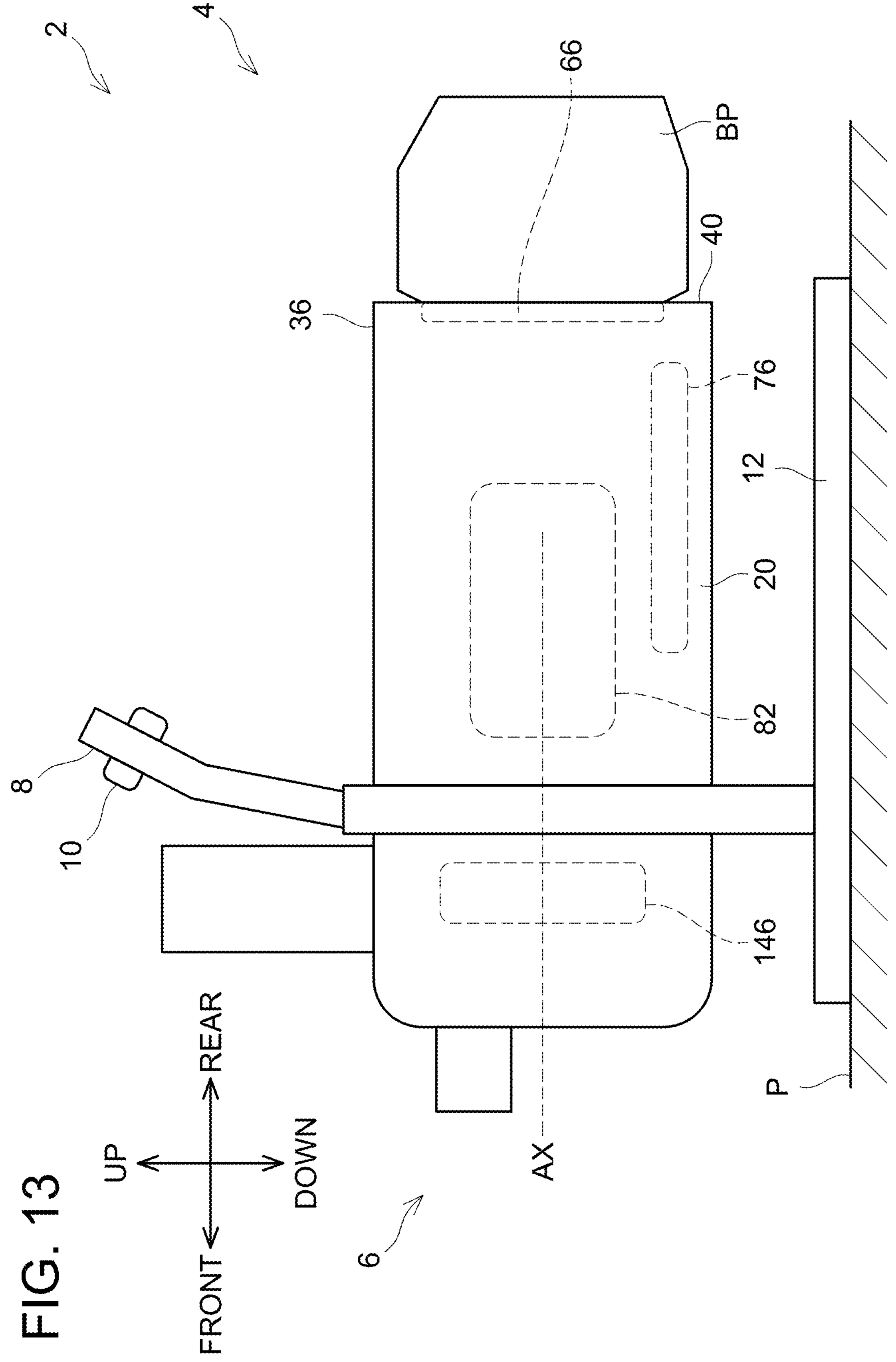
FIG. 13 illustrates a right side view of an electric pump 2 according to a third embodiment.

In a third embodiment, only points differing from the first embodiment will be described. As illustrated in FIG. 13, the battery holding part 66 is located behind the electric motor 82. The battery holding part 66 is located along a plane including the up-down and left-right directions. When the electric pump 2 is seen frontward, the battery holding part 66 is at least partially overlapped with each of the electric motor 82 and the impeller 146. The direction in which the battery pack BP is attached to the battery holding part 66 may be downward, leftward, or rightward.

Fourth Embodiment

Figure 14:
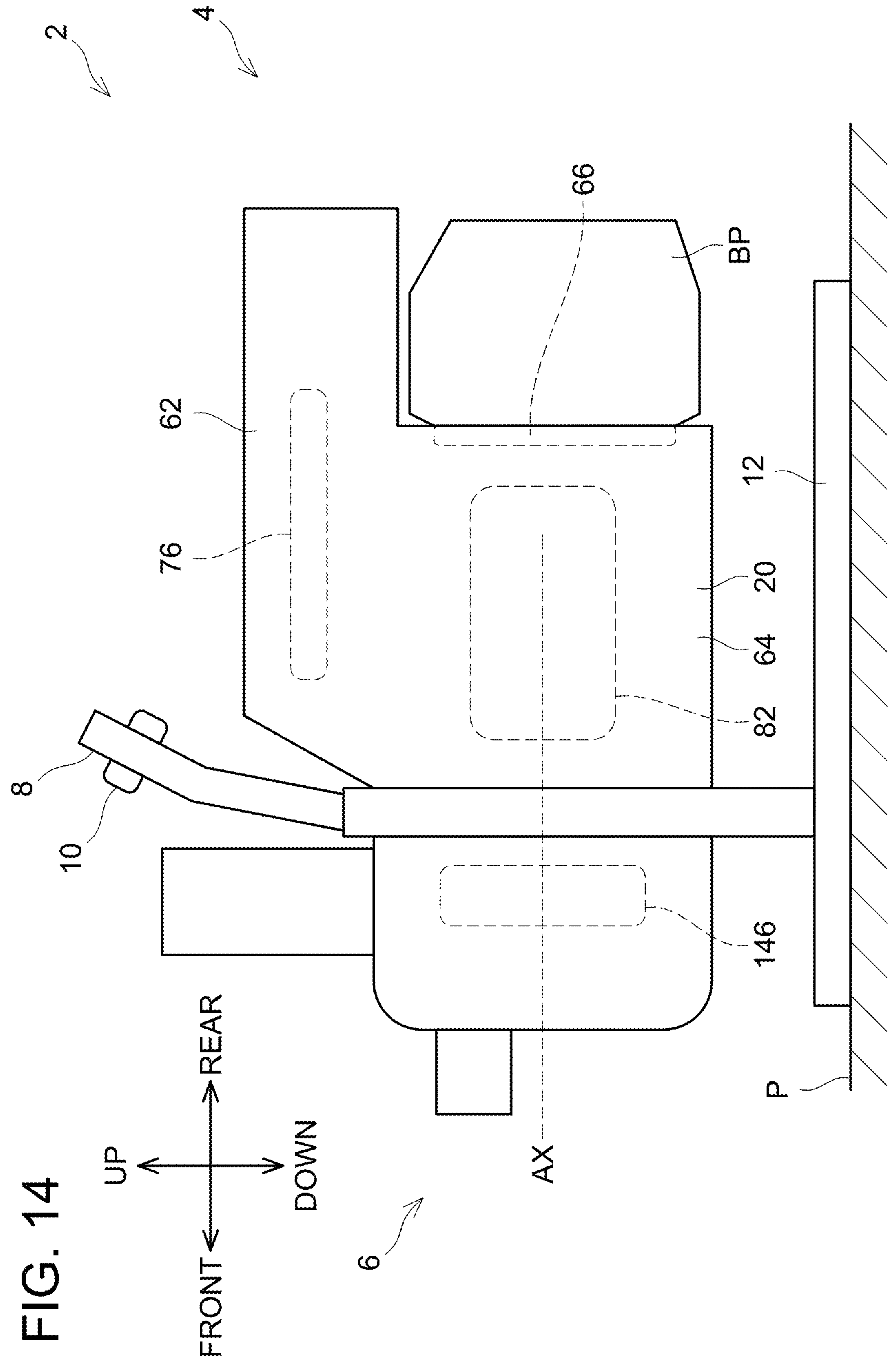
FIG. 14 illustrates a right side view of an electric pump 2 according to a fourth embodiment.

In a fourth embodiment, only points differing from the first embodiment will be described. As illustrated in FIG. 14, the board accommodating part 62 is located above the motor accommodating part 64. The board accommodating part 62 extends rearward beyond a rear end of the motor accommodating part 64.

The battery holding part 66 is located behind the electric motor 82. The battery holding part 66 is disposed in the motor accommodating part 64. The battery holding part 66 is located along a plane including the up-down and left-right directions. When the electric pump 2 is seen frontward, the battery holding part 66 is at least partially overlapped with each of the electric motor 82 and the impeller 146. The control unit 76 is located above the electric motor 82 and the battery holding part 66. The direction in which the battery pack BP is attached to the battery holding part 66 may be leftward or rightward.

Fifth Embodiment

Figure 15:
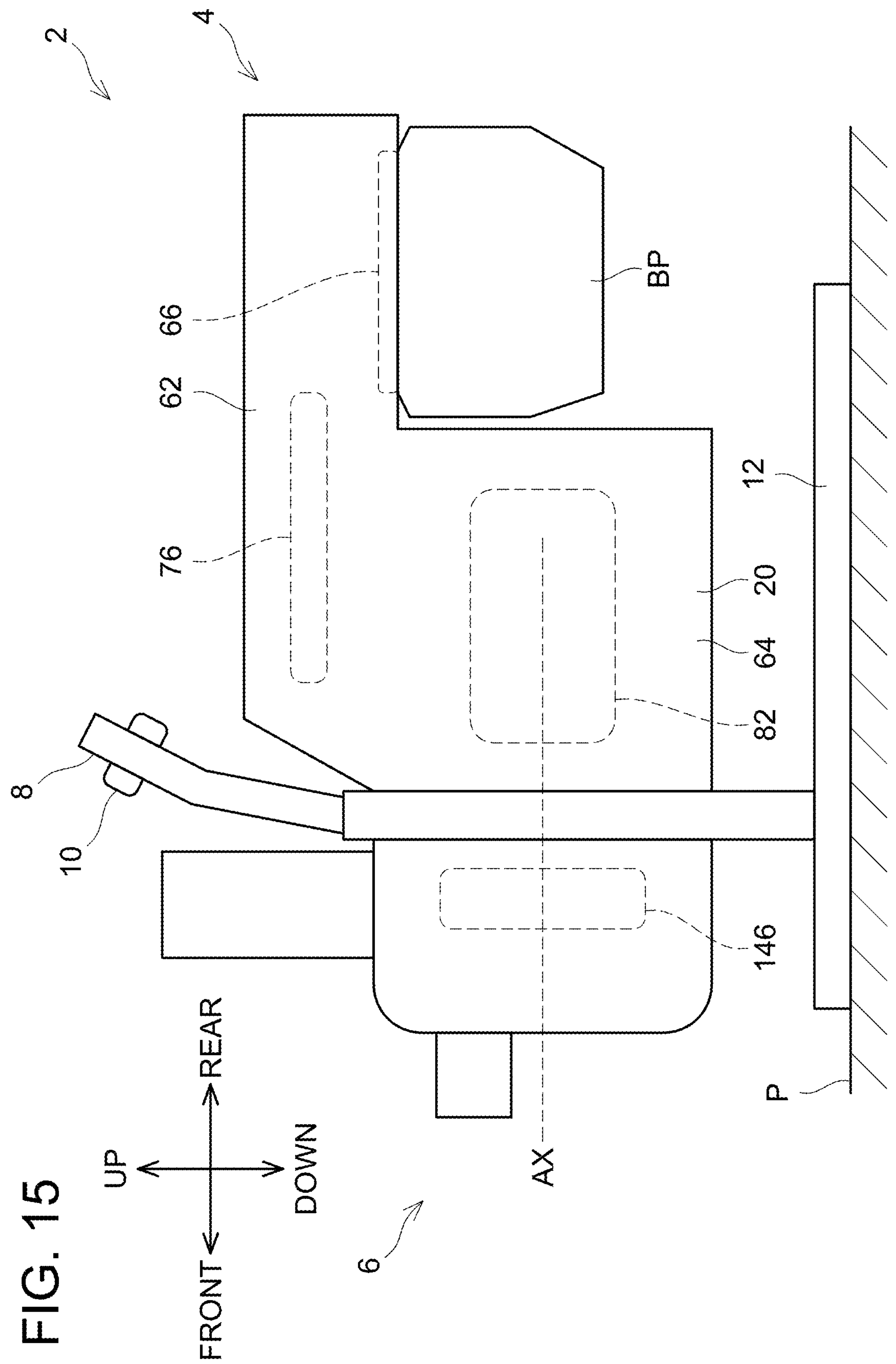
FIG. 15 illustrates a right side view of an electric pump 2 according to a fifth embodiment.

In a fifth embodiment, only points differing from the fourth embodiment will be described. As illustrated in FIG. 15, the battery holding part 66 is located at a rear and lower portion of the board accommodating part 62. The battery holding part 66 is located above the electric motor 82 and also below the control unit 76. The battery holding part 66 is located along a plane including the front-rear and left-right directions. In the front-rear direction, the battery holding part 66 is located on the rear side of a center in the front-rear direction of the control unit 76. When the electric pump 2 is seen downward, the battery holding part 66 is at least partially overlapped with the control unit 76. The direction in which the battery pack BP is attached to the battery holding part 66 may be frontward, leftward, or rightward.

Sixth Embodiment

Figure 16:
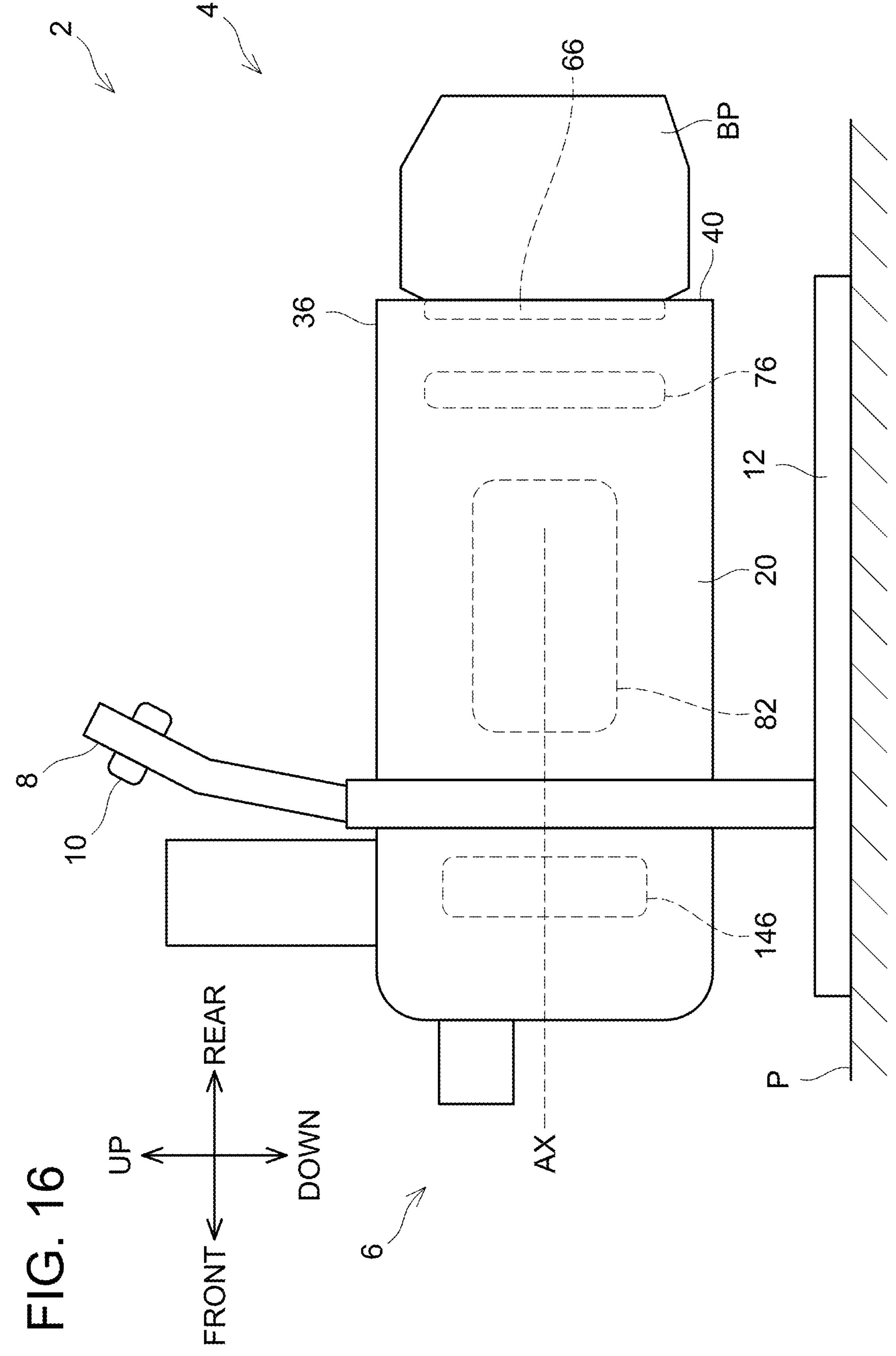
FIG. 16 illustrates a right side view of an electric pump 2 according to a sixth embodiment.

In a sixth embodiment, only points differing from the first embodiment will be described. As illustrated in FIG. 16, the control unit 76 is located behind the electric motor 82. The control unit 76 is located along a plane including the up-down and left-right directions. The battery holding part 66 is located behind the control unit 76. The battery holding part 66 is located along a plane including the up-down and left-right directions. When the electric pump 2 is seen frontward, the battery holding part 66 is at least partially overlapped with each of the control unit 76, the electric motor 82, and the impeller 146. The direction in which the battery pack BP is attached to the battery holding part 66 may be downward, leftward, or rightward.

Seventh Embodiment

Figure 17:
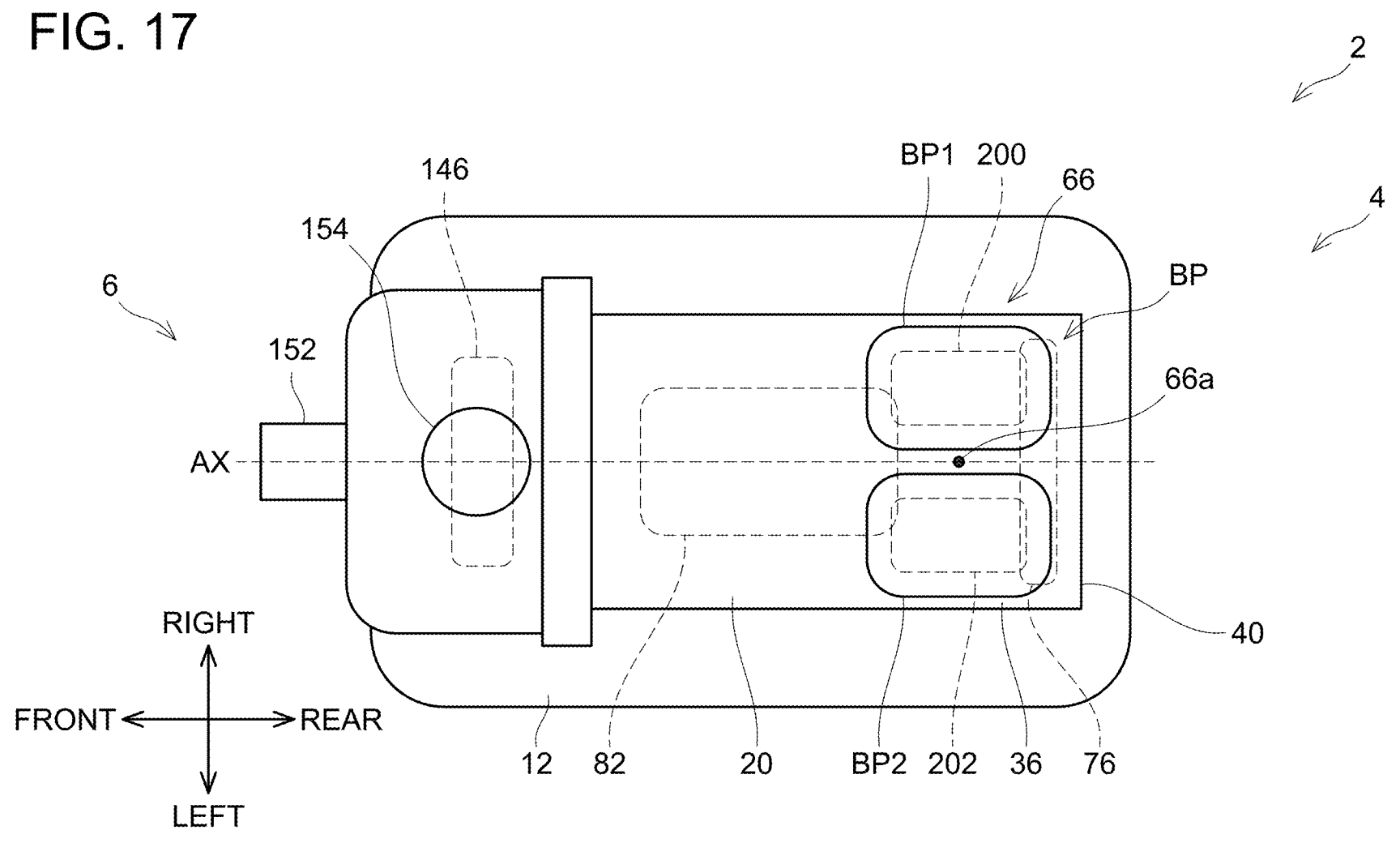

In a seventh embodiment, only points differing from the first embodiment will be described. As illustrated in FIG. 17, the control unit 76 is located behind the electric motor 82. The control unit 76 is located along a plane including the up-down and left-right directions.

The electric pump 2 comprises two battery packs BP. Hereafter, one of the battery packs BP will be termed a first battery pack BP1 and another of the battery packs BP will be termed a second battery pack BP2.

The battery holding part 66 comprises a first battery holding part 200 and a second battery holding part 202. The first battery holding part 200 holds the first battery pack BP1. The first battery pack BP1 is configured to be attached to and detached from the first battery holding part 200. The direction in which the first battery pack BP1 is attached to the first battery holding part 200 may be frontward, rearward, or leftward. The second battery holding part 202 holds the second battery pack BP2. The second battery pack BP2 is configured to be attached to and detached from the second battery holding part 202. The direction in which the second battery pack BP2 is attached to the second battery holding part 202 may be frontward, rearward, or rightward.

The first battery holding part 200 and the second battery holding part 202 are disposed on the rear upper wall 36 of the body housing 20. The first battery holding part 200 and the second battery holding part 202 are located along a plane including the front-rear and left-right directions. The first battery holding part 200 and the second battery holding part 202 are aligned in the left-right direction. When the electric pump 2 is seen downward, the center 66*a* between a right end of the first battery holding part 200 and a left end of the second battery holding part 202 is located on the central axis AX. The center 66*a* between the right end of the first battery holding part 200 and the left end of the second battery holding part 202 corresponds to the center 66*a* of the battery holding part 66 in the left-right direction. The first battery holding part 200 and the second battery holding part 202 are disposed respectively above each of the electric motor 82 and the control unit 76. When the electric pump 2 is seen downward, the first battery holding part 200 and the second battery holding part 202 are at least partially overlapped with each of the electric motor 82 and the control unit 76.

(Effects) In the present embodiment, the battery holding part 66 is configured to hold two battery packs BP.

According to the above configuration, the running time of the electric pump 2 can be lengthened and the output of the electric pump 2 can be increased.

Eighth Embodiment

Figure 18:
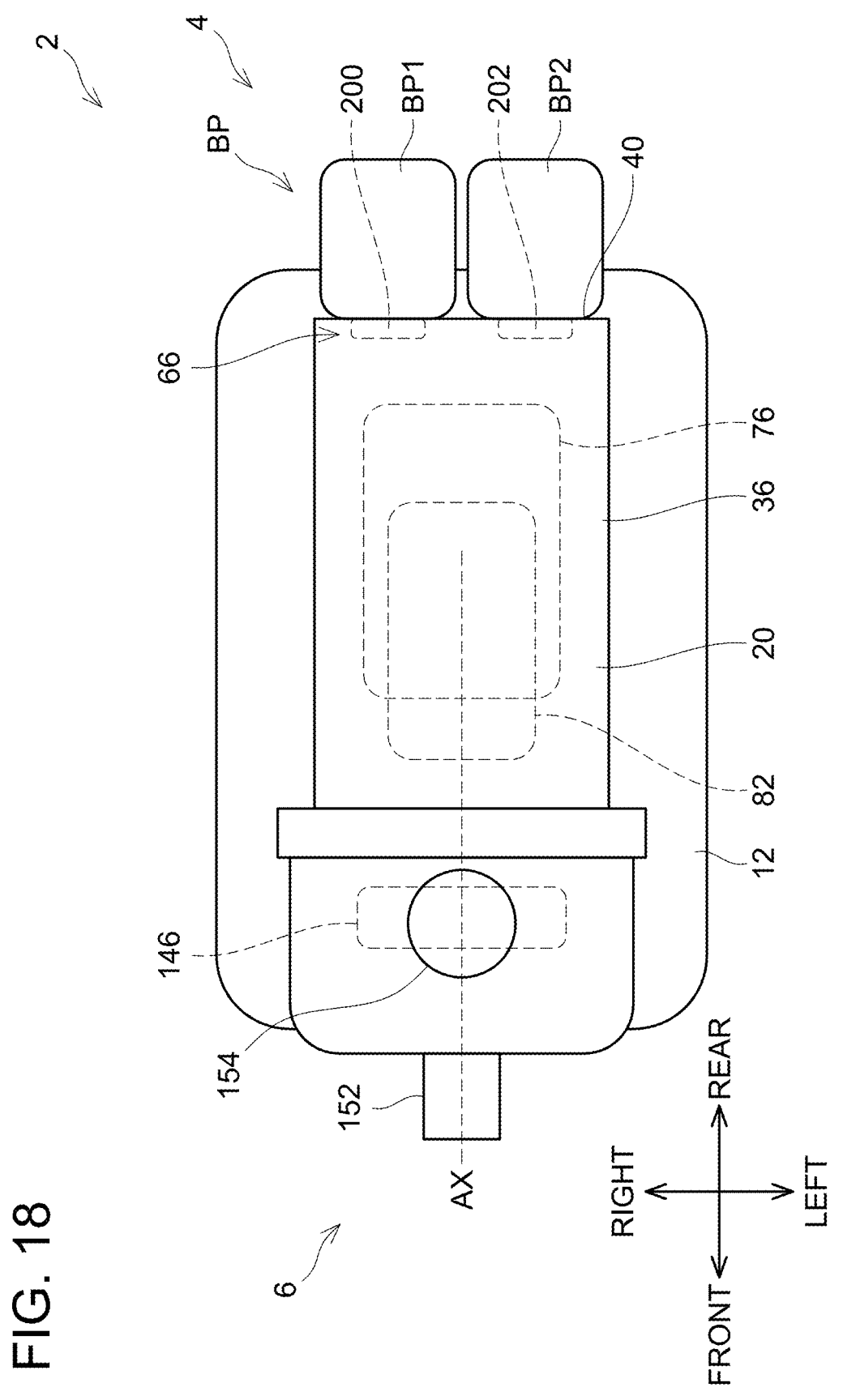

In an eighth embodiment, only points differing from the seventh embodiment will be described. As illustrated in FIG. 18, the control unit 76 is located below the electric motor 82. The control unit 76 is located along a plane including the front-rear and left-right directions.

The first battery holding part 200 and the second battery holding part 202 are disposed on the rear wall 40. The first battery holding part 200 and the second battery holding part 202 are located along a plane including the up-down and left-right directions. The first battery holding part 200 and the second battery holding part 202 are located behind the electric motor 82. When the electric pump 2 is seen frontward, the first battery holding part 200 and the second battery holding part 202 are at least partially overlapped with each of the electric motor 82 and the impeller 146. The direction in which the first battery pack BP1 is attached to the first battery holding part 200 may be downward or leftward. The direction in which the second battery pack BP2 is attached to the second battery holding part 202 may be downward or rightward.

Ninth Embodiment

Figure 19:
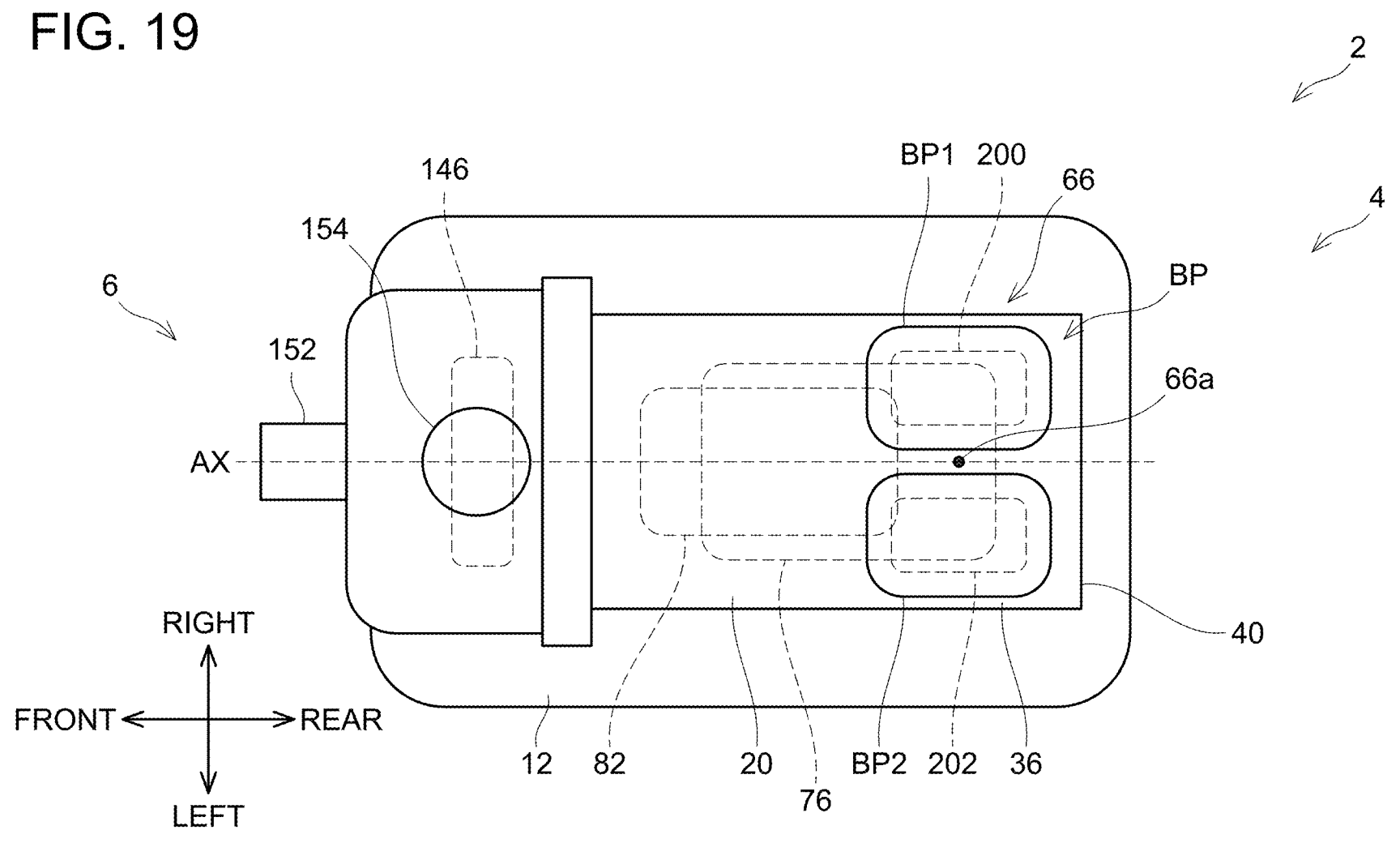

In a ninth embodiment, only points differing from the seventh embodiment will be described. As illustrated in FIG. 19, the control unit 76 is located along a plane including the front-rear and left-right directions. The control unit 76 is located below each of the electric motor 82, the first battery holding part 200, and the second battery holding part 202. When the electric pump 2 is seen downward, the control unit 76 is at least partially overlapped with each of the electric motor 82, the first battery holding part 200, and the second battery holding part 202.

Tenth Embodiment

Figure 20:
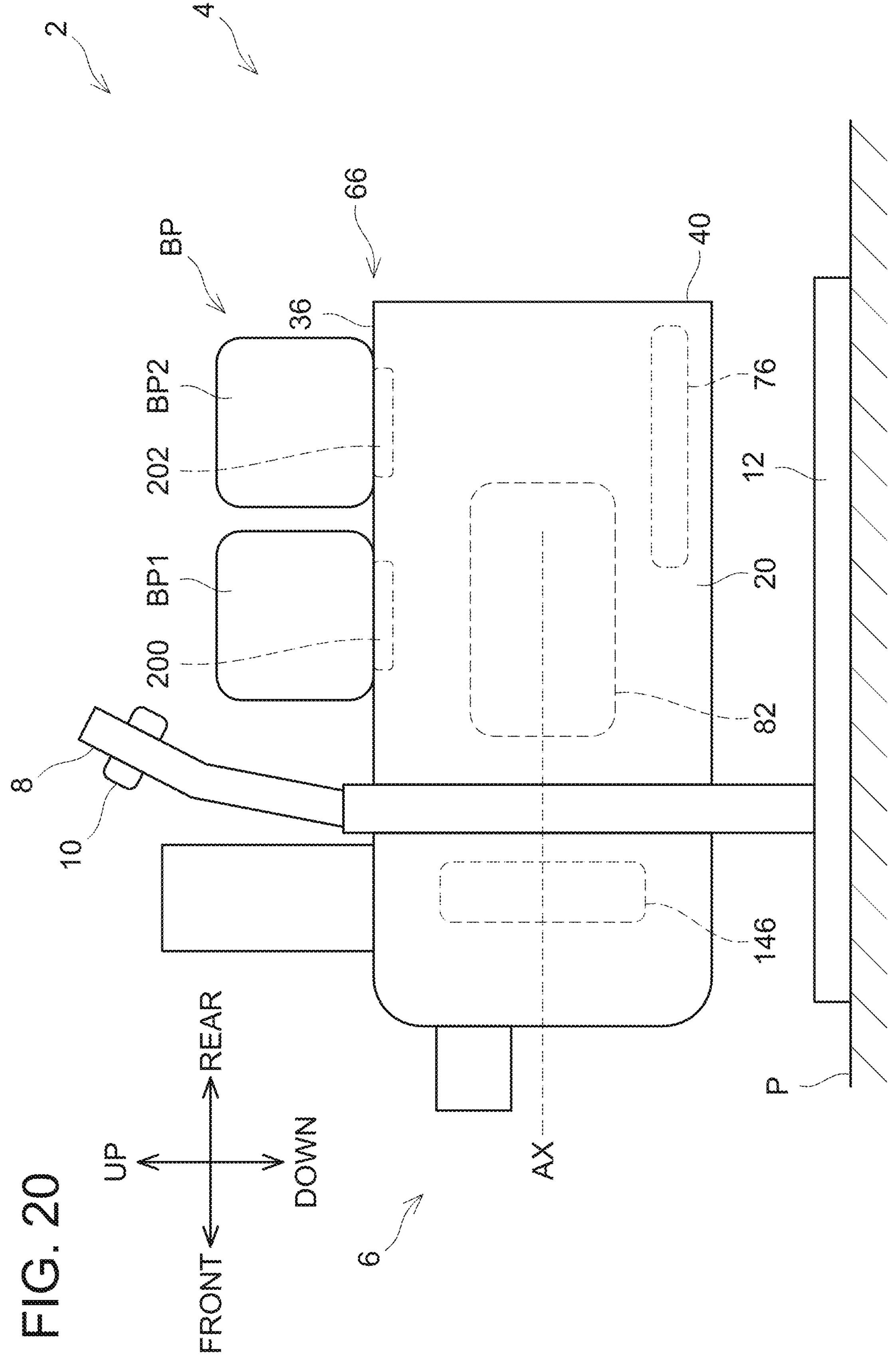
FIG. 20 illustrates a right side view of an electric pump 2 according to a tenth embodiment.

In a tenth embodiment, only points differing from the seventh embodiment will be described. As illustrated in FIG. 20, the control unit 76 is located along a plane including the front-rear and left-right directions. The control unit 76 is located below each of the electric motor 82, the first battery holding part 200, and the second battery holding part 202.

The first battery holding part 200 and the second battery holding part 202 are located above the electric motor 82. The first battery holding part 200 and the second battery holding part 202 are aligned in the front-rear direction. The direction in which the first battery pack BP1 is attached to the first battery holding part 200 may be leftward or rightward. The direction in which the second battery pack BP2 is attached to the second battery holding part 202 may be leftward or rightward.

Eleventh Embodiment

Figure 21:
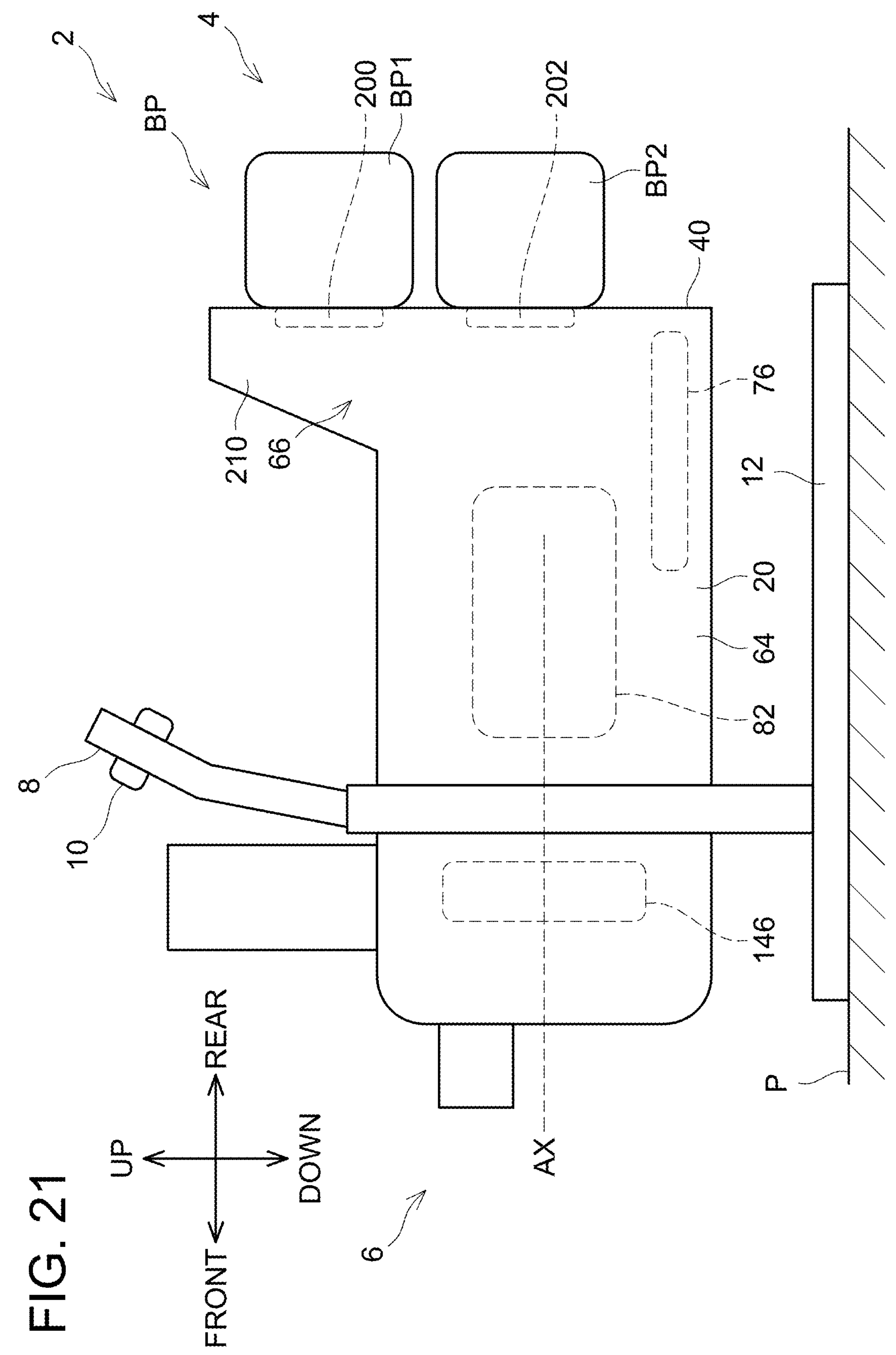
FIG. 21 illustrates a right side view of an electric pump 2 according to an eleventh embodiment.

In an eleventh embodiment, only points differing from the seventh embodiment will be described. As illustrated in FIG. 21, the control unit 76 is located below the electric motor 82.

The control unit 76 is located along a plane including the front-rear and left-right directions.

The body housing 20 comprises a projection 210 projecting upward from a rear and upper portion of the motor accommodating part 64. The first battery holding part 200 is located on a rear end of the projection 210. The first battery holding part 200 is located along a plane including the up-down and left-right directions. The direction in which the first battery pack BP1 is attached to the first battery holding part 200 may be leftward or rightward.

The second battery holding part 202 is located on a rear end of the motor accommodating part 64. The second battery holding part 202 is located below the first battery holding part 200. The second battery holding part 202 is located behind the electric motor 82. The second battery holding part 202 is located along a plane including the up-down and left-right directions. The direction in which the second battery holding part 202 is attached to the second battery holding part 202 may be leftward or rightward.

Twelfth Embodiment

Figure 22:
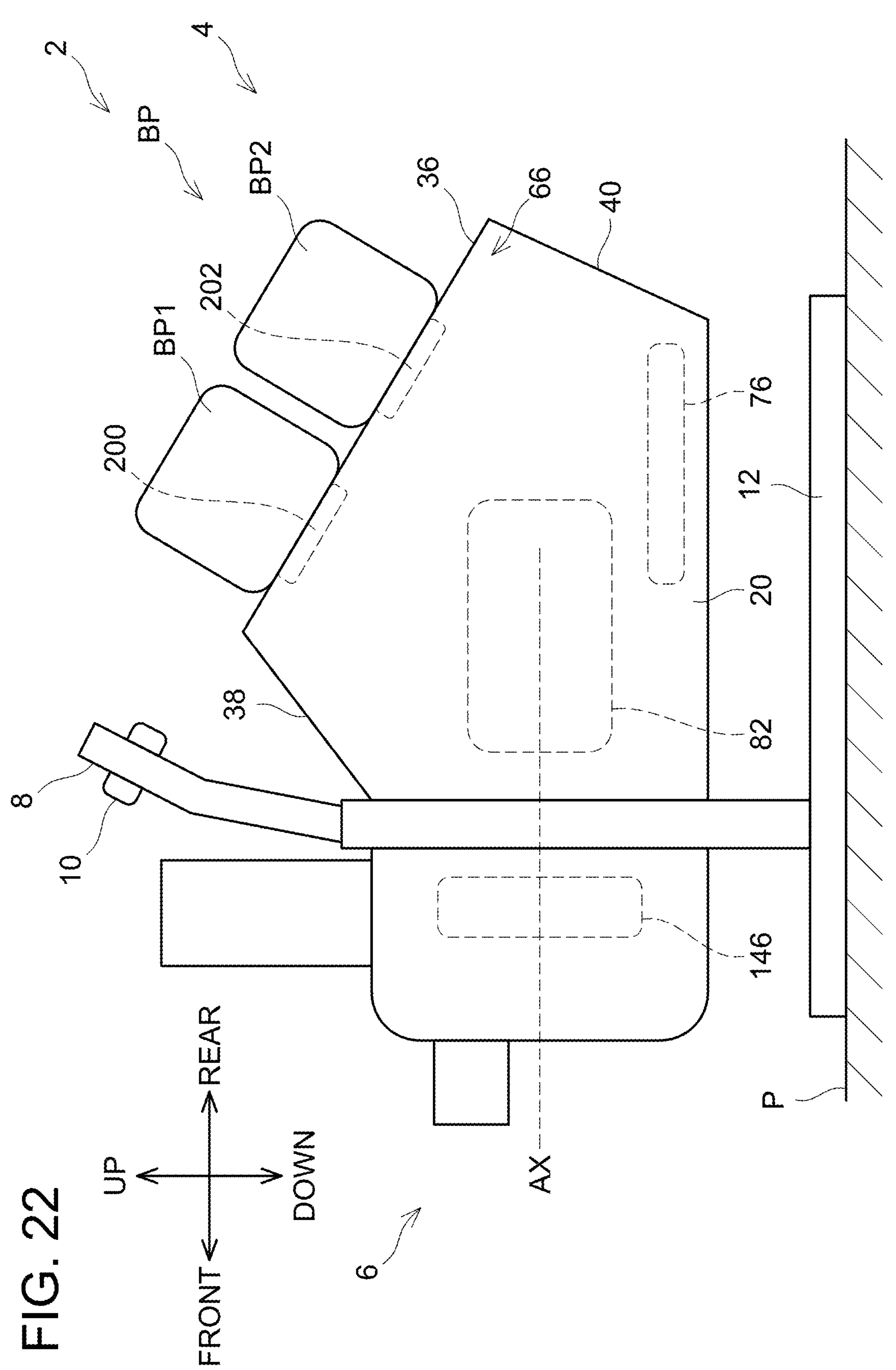
FIG. 22 illustrates a right side view of an electric pump 2 according to a twelfth embodiment.

In a twelfth embodiment, only points differing from the seventh embodiment will be described. As illustrated in FIG. 22, the front upper wall 38 of the body housing 20 extends rear and upward from a front end of the front upper wall 38. The rear upper wall 36 of the body housing 20 extends rear and downward from the front end of the rear upper wall 36.

The first battery holding part 200 and the second battery holding part 202 are located on the rear upper wall 36. The first battery holding part 200 is located above the electric motor 82. The direction in which the first battery pack BP1 is attached to the first battery holding part 200 may be leftward or rightward. The second battery holding part 202 is located on the rear side of the first battery holding part 200. The second battery holding part 202 is located above the control unit 76. The direction in which the second battery pack BP2 is attached to the second battery holding part 202 may be leftward or rightward.

The control unit 76 is located below the electric motor 82. The control unit 76 is located along a plane including the front-rear and left-right directions.

Thirteenth Embodiment

Figure 23:
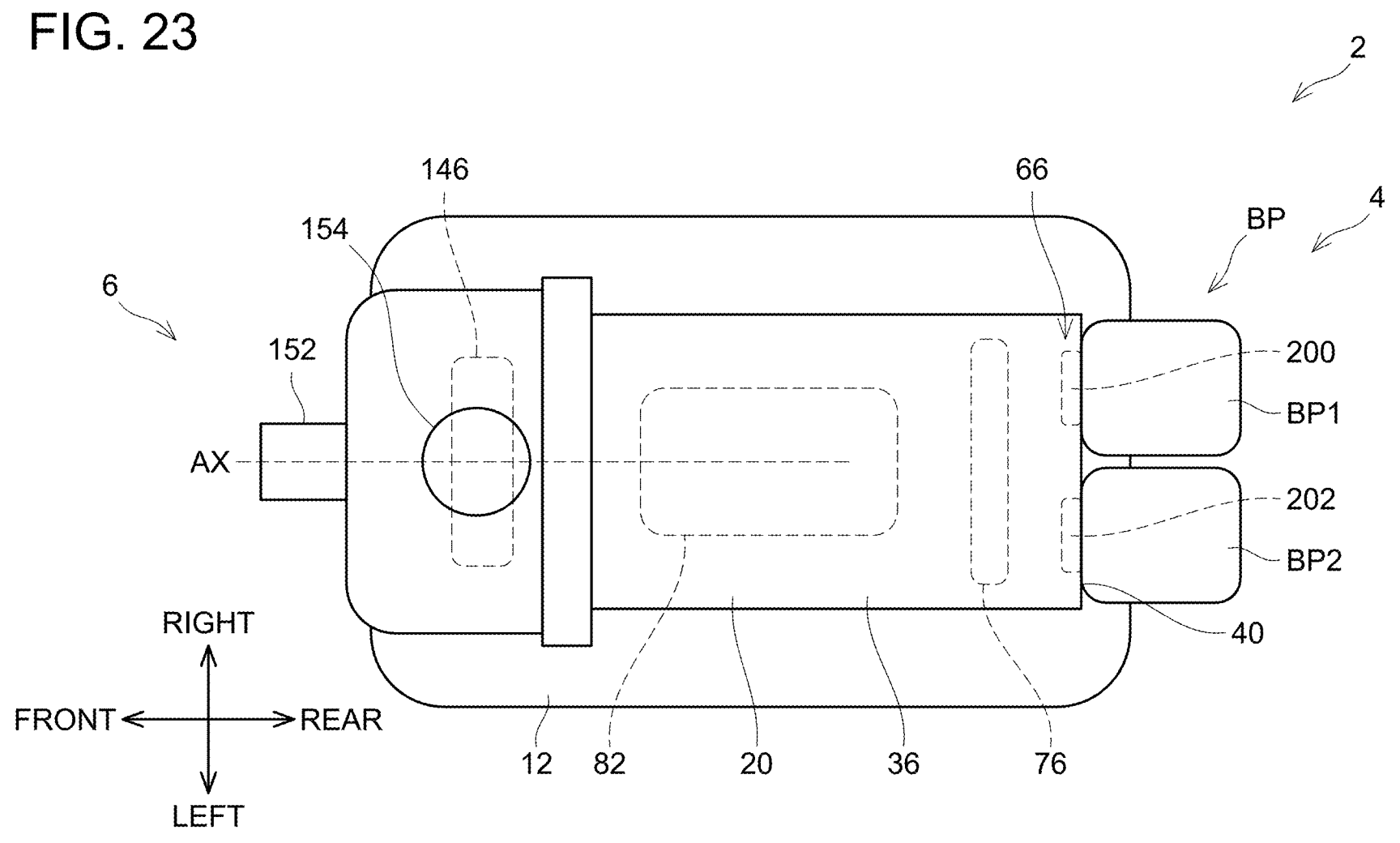

In a thirteenth embodiment, only points differing from the seventh embodiment will be described. As illustrated in FIG. 23, the control unit 76 is located behind the electric motor 82. The control unit 76 is located along a plane including the up-down and left-right directions. The first battery holding part 200 and the second battery holding part 202 are located behind the control unit 76. The first battery holding part 200 and the second battery holding part 202 are located along a plane including the up-down and left-right directions. The direction in which the first battery pack BP1 is attached to the first battery holding part 200 may be downward or leftward. The direction in which the second battery pack BP2 is attached to the second battery holding part 202 may be downward or rightward.

Fourteenth Embodiment

Figure 24:
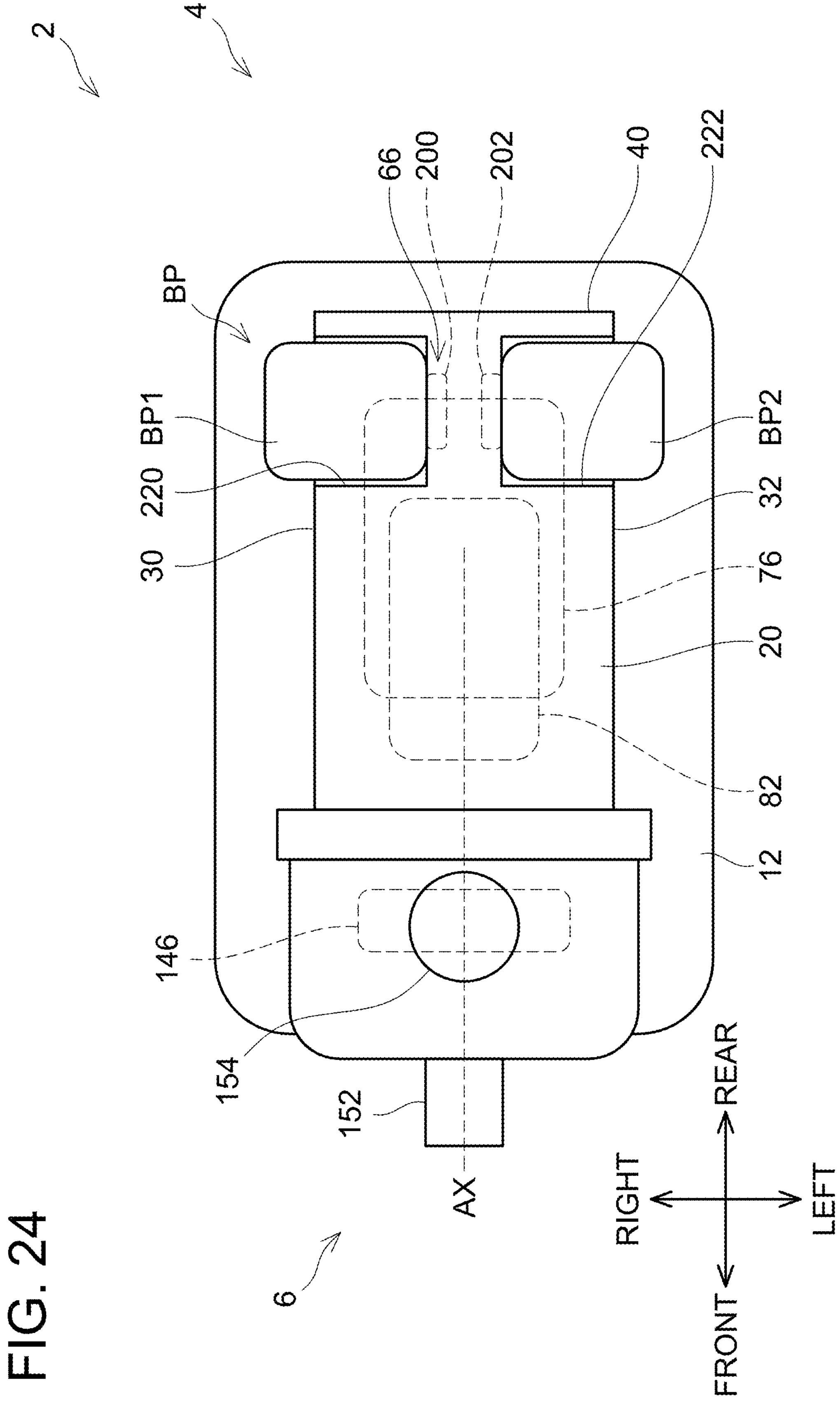
FIG. 24 illustrates a top view of an electric pump 2 according to a fourteenth embodiment.

In a fourteenth embodiment, only points differing from the seventh embodiment will be described. As illustrated in FIG. 24, the control unit 76 is located below the electric motor 82. The control unit 76 is located along a plane including the front-rear and left-right directions.

The body housing 20 has a first recess 220 recessed leftward from the right wall 30 and a second recess 222 recessed rightward from the left wall 32. The first battery holding part 200 and the second battery holding part 202 are located between the first recess 220 and the second recess 222. The first battery holding part 200 and the second battery holding part 202 are located along a plane including the up-down and front-rear directions. The first battery pack BP1 is held by the first battery holding part 200 inside the first recess 220. The direction in which the first battery pack BP1 is attached to the first battery holding part 200 is downward. The second battery pack BP2 is held by the second battery holding part 202 inside the second recess 222. The direction in which the second battery pack BP2 is attached to the second battery holding part 202 is downward.

Fifteenth Embodiment

Figure 25:
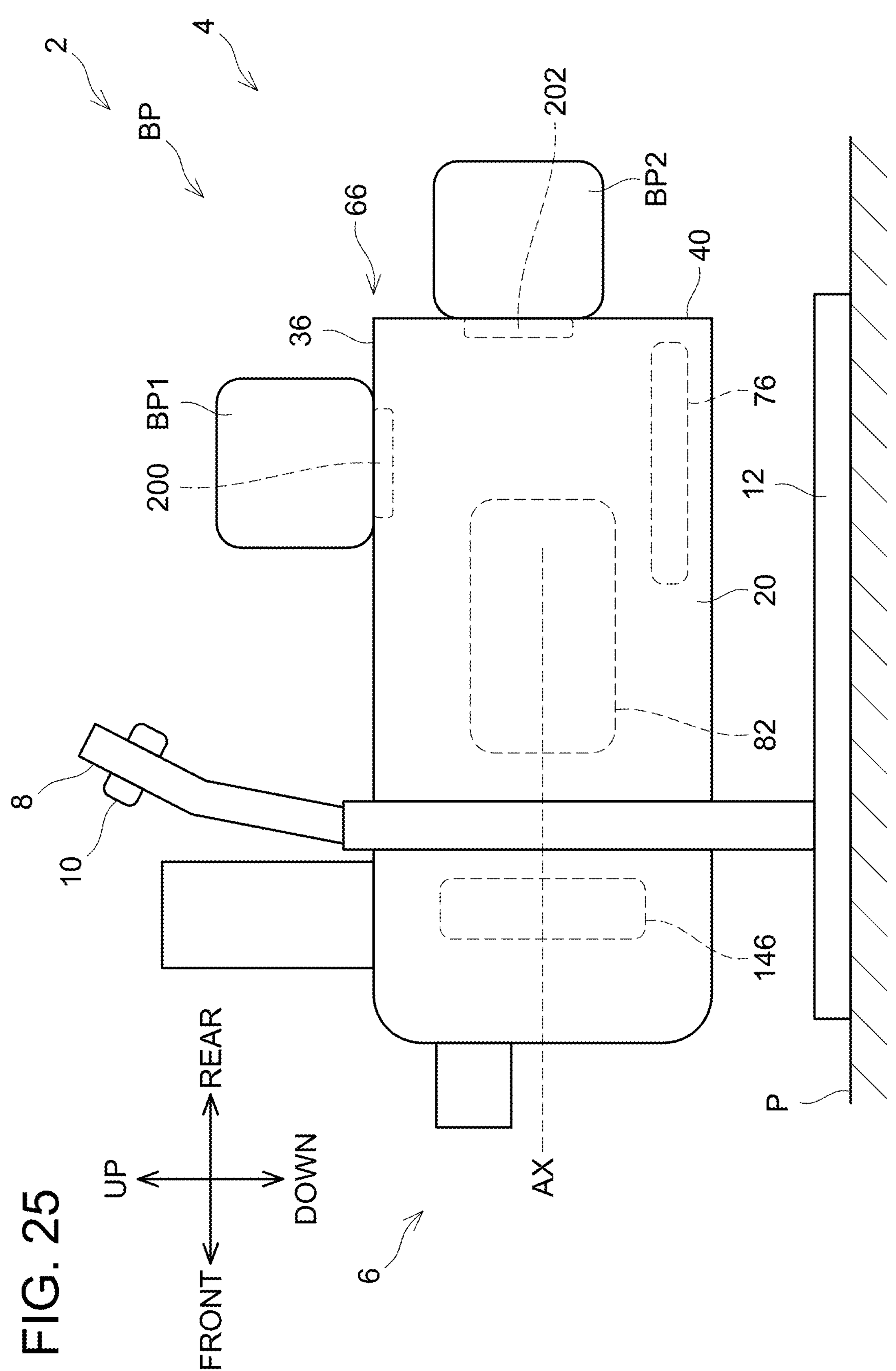
FIG. 25 illustrates a right side view of an electric pump 2 according to a fifteenth embodiment.

In a fifteenth embodiment, only points differing from the seventh embodiment will be described. As illustrated in FIG. 25, the control unit 76 is located below the electric motor 82. The control unit 76 is located along a plane including the front-rear and left-right directions.

The first battery holding part 200 is located on the rear upper wall 36. The first battery holding part 200 is located above the electric motor 82 and the control unit 76. The first battery holding part 200 is located along a plane including the front-rear and left-right directions. The direction in which the first battery pack BP1 is attached to the first battery holding part 200 may be frontward, leftward, or rightward.

The second battery holding part 202 is disposed on the rear wall 40. The second battery holding part 202 is located behind the electric motor 82. The second battery holding part 202 is located along a plane including the up-down and left-right directions. The direction in which the second battery pack BP2 is attached to the second battery holding part 202 may be downward, leftward, or rightward.

Sixteenth Embodiment

Figure 26:
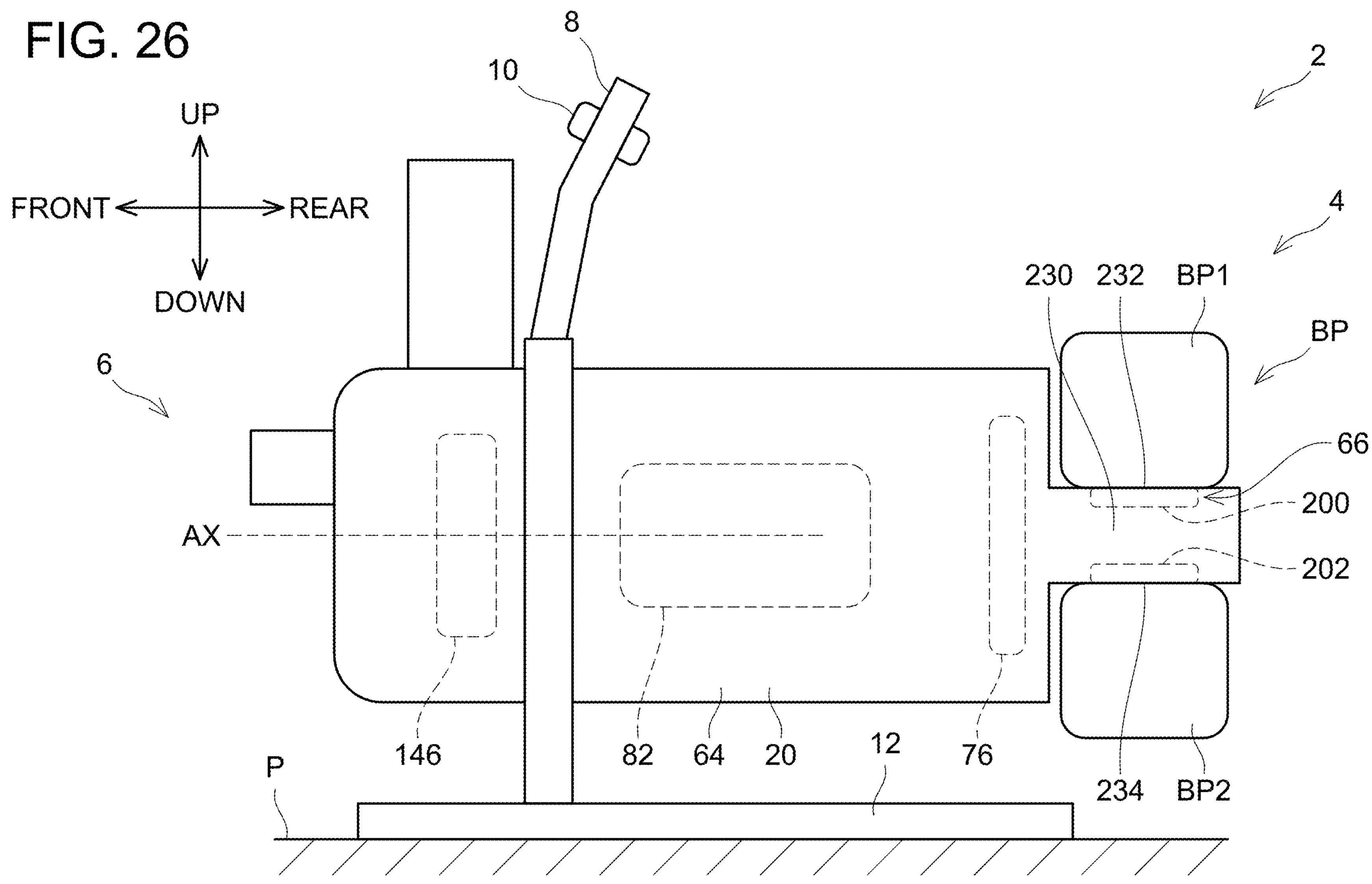
FIG. 26 illustrates a right side view of an electric pump 2 according to a sixteenth embodiment.

In a sixteenth embodiment, only points differing from the seventh embodiment will be described. As illustrated in FIG. 26, the control unit 76 is located behind the electric motor 82. The control unit 76 is located along a plane including the up-down and left-right directions.

The first battery holding part 200 and the second battery holding part 202 are located behind the control unit 76. The body housing 20 comprises a projection 230 projecting rearward from a rear end of the motor accommodating part 64. The first battery holding part 200 is located on an upper wall 232 of the projection 230. The second battery holding part 202 is located on a lower wall 234 of the projection 230. The first battery holding part 200 and the second battery holding part 202 are located along a plane including the front-rear and left-right directions. The direction in which the first battery pack BP1 is attached to the first battery holding part 200 may be frontward, may be leftward, or may be rightward. The direction in which the second battery pack BP2 is attached to the second battery holding part 202 may be downward, may be leftward, or may be rightward.

Modifications

In an aspect, another end of the motor unit 4 may be fixed to the base 12.

In the electric pump 2 according to an aspect, at least one of the center 66*a* of the battery holding part 66, the center 82*a* of the electric motor 82, the center 76*a* of the control unit 76, the center 186*a* of the grip part 186, and the center of gravity G1 of the electric pump 2 may not be located on the first plane 96.

In the motor unit 4 according to an aspect, the throttle cover 52 may be fixed to the right body housing 22. The air intake cover 54 may be fixed to the left body housing 24.

In the motor unit 4 according to an aspect, the throttle wire 56 may extend rearward, upward, or downward from the throttle cover 52.

What is claimed is:

1. An electric pump comprising:
- a motor unit; and
- a pump unit configured to be driven by the motor unit and discharge water,
- wherein the motor unit comprises:
  - a body housing comprising a battery holding part configured to hold at least one battery pack; and
  - an electric motor accommodated in the body housing and configured to drive the pump unit,
  - wherein the at least one battery pack is configured to be used in the electric pump and in an apparatus other than the electric pump,
- the pump unit includes a discharge port configured to discharge the water,
- the body housing comprises an upper wall on which the battery holding part is disposed,
- when the electric pump is placed on a placement surface having a placement plane, the upper wall is located below the discharge port and an entirety of the upper wall is located above the electric motor,
- a battery terminal configured to be electrically connected to a terminal of the at least one battery pack held in the battery holding part is disposed on the upper wall, and
- the upper wall is inclined relative to the placement plane when the electric pump is placed on the placement surface.

2. The electric pump according to claim 1, wherein the electric motor is a brushless motor which comprises a stator and a rotor,
- the motor unit further comprises:
  - a control unit accommodated in the body housing and configured to drive the electric motor, and
  - a fan configured to rotate integrally with the rotor,
  - wherein the fan rotates and generates an air flow which cools the control unit in the body housing.

3. The electric pump according to claim 2, wherein the motor unit is configured to be attached to and be detached from the pump unit,
- one end of the motor unit is supported by the pump unit,
- another end of the motor unit is a free end,
- the electric pump further comprises a contact part located below the body housing and in contact with the placement surface when the electric pump is placed on the placement plane,
- the battery holding part is located above the electric motor when the electric pump is placed on the placement plane,
- the electric motor is configured to rotate about a central axis extending in a front-rear direction,
- a length in a left-right direction of the body housing is shorter than a length in the left-right direction of the contact part, wherein the left-right direction is perpendicular to both the front-rear direction and an up-down direction perpendicular to the placement plane,
- the length in the left-right direction of the body housing is shorter than a length in the left-right direction of the pump unit,
- the electric pump further comprises a handle fixed to the pump unit and comprising a grip part configured to be gripped by a user,
- a center of gravity of the electric pump is located farther away from the pump unit than the grip part is in the front-rear direction,
- the electric motor is at least partially overlapped with the battery holding part when the electric pump is seen along the up-down direction perpendicular to the placement plane, with the electric pump placed on the placement plane,
- the electric motor is at least partially overlapped with the control unit when the electric pump is seen along the up-down direction perpendicular to the placement plane, with the electric pump placed on the placement plane,
- a center of the battery holding part and a center of the electric motor are located on a first plane in the left-right direction perpendicular to both the front-rear direction and the up-down direction,
- a center of the control unit is located on the first plane in the left-right direction,
- the at least one battery pack comprises two battery packs, and
- the battery holding part is configured to hold the two battery packs.

4. The electric pump according to claim 1, wherein the motor unit is configured to be attached to and detached from the pump unit.

5. The electric pump according to claim 1, wherein one end of the motor unit is supported by the pump unit, and another end of the motor unit is a free end.

6. The electric pump according to claim 1, further comprising a contact part located below the body housing and in contact with the placement surface when the electric pump is placed on the placement plane.

7. The electric pump according to claim 6, wherein the battery holding part is located above the electric motor when the electric pump is placed on the placement plane.

8. The electric pump according to claim 6, wherein the electric motor is configured to rotate about a central axis extending in a front-rear direction, and
- a length in a left-right direction of the body housing is shorter than a length in the left-right direction of the contact part, wherein the left-right direction is perpendicular to both the front-rear direction and an up-down direction perpendicular to the placement plane.

9. The electric pump according to claim 8, wherein the length in the left-right direction of the body housing is shorter than a length in the left-right direction of the pump unit.

10. The electric pump according to claim 1, further comprising a handle fixed to the pump unit and comprising a grip part configured to be gripped by a user,
- wherein the electric motor is configured to rotate about a central axis extending in a front-rear direction, and
- a center of gravity of the electric pump is located farther away from the pump unit than the grip part is in the front-rear direction.

11. The electric pump according to claim 1, wherein the motor unit further comprises a control unit accommodated in the body housing and configured to drive the electric motor, and the electric motor is at least partially overlapped with the battery holding part when the electric pump is seen along an up-down direction perpendicular to the placement plane, with the electric pump placed on the placement plane.

12. The electric pump according to claim 11, wherein the electric motor is at least partially overlapped with the control unit when the electric pump is seen along the up-down direction, with the electric pump placed on the placement plane.

13. The electric pump according to claim 11, wherein the electric motor is configured to rotate about a central axis extending in a front-rear direction, and a center of the battery holding part and a center of the electric motor are located on a first plane in a left-right direction perpendicular to both the front-rear direction and the up-down direction.

14. The electric pump according to claim 13, wherein a center of the control unit is located on the first plane in the left-right direction.

15. The electric pump according to claim 1, wherein the at least one battery pack comprises two battery packs, and the battery holding part is configured to hold the two battery packs.

16. The electric pump according to claim 1, wherein the upper wall slopes downward in a rear direction, and the pump unit is fixed to a front end of the motor unit.

* * * * *